(12) United States Patent
Pham

(10) Patent No.: US 11,072,157 B2
(45) Date of Patent: Jul. 27, 2021

(54) METHOD AND APPARATUS FOR FORMING CONTOURED STIFFENERS

(71) Applicant: The Boeing Company, Chicago, IL (US)

(72) Inventor: Doan D. Pham, Lacey, WA (US)

(73) Assignee: The Boeing Company, Chicago, IL (US)

( * ) Notice: Subject to any disclaimer, the term of this patent is extended or adjusted under 35 U.S.C. 154(b) by 668 days.

(21) Appl. No.: 14/747,301

(22) Filed: Jun. 23, 2015

(65) Prior Publication Data

US 2016/0375675 A1    Dec. 29, 2016

(51) Int. Cl.
| | |
|---|---|
| *B32B 38/18* | (2006.01) |
| *B29C 70/30* | (2006.01) |
| *B29C 70/34* | (2006.01) |
| *B29C 70/38* | (2006.01) |
| *B29D 99/00* | (2010.01) |

(52) U.S. Cl.
CPC .......... *B32B 38/1808* (2013.01); *B29C 70/30* (2013.01); *B29C 70/342* (2013.01); *B29C 70/38* (2013.01); *B29D 99/0014* (2013.01); *B32B 38/1866* (2013.01); *B32B 2305/08* (2013.01); *B32B 2307/70* (2013.01); *Y02T 50/40* (2013.01)

(58) Field of Classification Search
CPC ................................ B65H 83/02; B65H 85/00
See application file for complete search history.

(56) References Cited

U.S. PATENT DOCUMENTS

| | | | | |
|---|---|---|---|---|
| 4,491,493 | A * | 1/1985 | Eaton | B29C 70/386 156/235 |
| 5,076,873 | A | 12/1991 | Lowery | |
| 5,387,098 | A | 2/1995 | Willden | |
| 5,954,917 | A * | 9/1999 | Jackson | B29C 70/342 156/433 |
| 7,901,531 | B2 | 3/2011 | Pham et al. | |
| 8,465,613 | B2 | 6/2013 | Rotter et al. | |
| 8,534,339 | B2 | 9/2013 | Pham et al. | |
| 2007/0175572 | A1* | 8/2007 | Rubin | B29C 70/525 156/196 |
| 2009/0033040 | A1* | 2/2009 | Cleary, Jr. | B29C 33/76 277/630 |

(Continued)

FOREIGN PATENT DOCUMENTS

| | | |
|---|---|---|
| EP | 0668146 A1 | 8/1995 |
| JP | 2012506791 A | 3/2012 |

(Continued)

OTHER PUBLICATIONS

Extended European Report Search, dated Dec. 5, 2016, regarding Application No. EP16175419.7, 9 pages.

(Continued)

*Primary Examiner* — Daniel McNally
(74) *Attorney, Agent, or Firm* — Yee & Associates, P.C.

(57) ABSTRACT

A composite structure such as a stringer is produced by laying up composite charges at a layup station, spooling the charges onto a roll and transporting the roll to a forming station where the charges are unrolled and formed into individual components of the stringer. The components are then transferred to an assembly station where they are assembled together and vacuum bagged in preparation for curing.

18 Claims, 22 Drawing Sheets

(56) References Cited

U.S. PATENT DOCUMENTS

| | | | |
|---|---|---|---|
| 2009/0123708 A1 | 5/2009 | Depase et al. | |
| 2010/0024971 A1 | 2/2010 | Benson et al. | |
| 2010/0102482 A1* | 4/2010 | Jones | B29C 43/58 |
| | | | 264/320 |
| 2011/0247743 A1* | 10/2011 | Slack | B29C 70/50 |
| | | | 156/64 |
| 2012/0076989 A1* | 3/2012 | Bland | B29D 99/0003 |
| | | | 428/174 |
| 2014/0065354 A1 | 3/2014 | Smith, Jr. et al. | |

FOREIGN PATENT DOCUMENTS

| | | |
|---|---|---|
| JP | 2012218441 A | 11/2012 |
| JP | 2013248848 A | 12/2013 |

OTHER PUBLICATIONS

Japanese Notice of Reasons for Rejection and English translation, dated Apr. 22, 2020, regarding Application No. JP2016-118796, 9 pages.

Japanese Notice of Reasons for Rejection and English translation, dated Dec. 15, 2020, regarding Application No. JP2016-118796, 6 pages.

European Office Action dated Mar. 22, 2021, regarding Application No. 16175419.7, 5 pages.

* cited by examiner

METHOD AND APPARATUS FOR FORMING CONTOURED STIFFENERS

BACKGROUND INFORMATION

1. Field

The present disclosure generally relates to processes and equipment for producing composite laminate stiffeners, and deals more particularly with a method and apparatus for producing stringers having contours.

2. Background

Composite laminate stiffeners such as stringers are often produced by assembling and co-curing multiple composite components. In some stiffener applications, such as the stringers used in the wings and fuselage of an aircraft, the stringers are required to be contoured along their length. Because of the changing geometries of a wing or fuselage, many of the stringers are uniquely contoured and thus must be formed using different sets of forming tools. Moreover, the tool sets used to cure the stringers are often different from the tool sets used to form the stringers to the desire contours. The need for multiple sets of differently configured tools adds to capital expense and floor space requirements, and may limit production rate.

Accordingly, there is a need for a method and apparatus for producing contoured composite stiffeners such as stringers, which reduce tooling costs as well as floor space requirements, while increasing production rate.

SUMMARY

The disclosed embodiments provide a method and apparatus for fabricating elongate stiffeners such as stringers, particularly those that are contoured along their length. The method permits forming the stringers in contour rather than forming them straight and then bending them to the desired contour. The apparatus is readily reconfigurable to form stiffeners having various contours, thus reducing tooling costs. The stiffeners may be formed hot or cold, either single ply, multiple plies or entire stacks, in a single forming operation. By forming the stiffeners in contour, ply wrinkling is substantially reduced or eliminated. Components of the stiffener are produced by forming composite charges to the desired contours using mechanical pressure without the need for vacuum pressure.

According to one disclosed embodiment, a method is provided of fabricating a contoured composite stiffener. The method comprises assembling a composite charge, including laying up at least one composite ply, and rolling the composite charge onto a roll. The method further comprises transporting the roll having the composite charge thereon to a forming station including a forming mandrel, and configuring a shape of the forming mandrel to substantially match a contour of the composite stiffener. It also includes placing the composite charge on the forming mandrel, including unrolling the composite charge from the roll at the forming station, and forming the composite charge on the forming mandrel. The method may further comprise placing a flexible film on a substrate. Assembling the composite charge includes laying up composite plies on the flexible film, and rolling the composite charge onto the roll includes rolling the flexible film having the composite plies laid up thereon onto the roll. Unrolling the composite charge includes unrolling the flexible film from the roll. The method may also include assembling the composite charge including laying up additional composite plies on differing sections of the flexible film. Rolling the composite charge includes rolling each of the sections of the flexible film onto the roll. Configuring the shape of the former includes adjusting a mandrel support to generally match the contour of the composite stiffener, loading a mandrel onto the mandrel support, and configuring the shape of the forming mandrel to substantially match the contour of the mandrel support. Forming the composite charge and the forming mandrel includes moving the mandrel support having the mandrel thereon beneath a former, clamping a first section of the composite charge against a first portion of the forming mandrel using a first forming member on the former, and forming a second section of the composite charge onto a second portion of the forming mandrel using a second forming member on the former. The method may further comprise transporting the forming mandrel having the formed composite charge thereon to an assembly station, and assembling the formed composite charge with at least one component at the assembly station.

According to another disclosed embodiment, a method is provided of fabricating a contoured composite blade stringer, comprising laying up a plurality of composite charges at a layup station, rolling up each of the composite charges, and transporting each of the rolled up composite charges from the layup station to a forming station. The method further includes unrolling each of the composite charges at the forming station and forming each of the composite charges into a contoured stringer component. The method further comprises transporting the stringer components from the forming station to an assembly station, and assembling the stringer components at the assembly station. Laying up a plurality of composite charges includes unrolling a continuous flexible film onto a substrate, and laying up composite plies on the flexible film. Rolling up each of the composite charges includes rolling up the flexible film along with the composite charges onto a roll, and transporting the rolled up composite charges includes transporting the roll from the layup station to the forming station. The method may further comprise adjusting a shape of a forming mandrel to substantially match the contour of the composite blade stringer, and forming each of the composite charges includes placing the composite charge on the forming mandrel and forming the composite charge over the forming mandrel. Forming each of the composite charges includes clamping a first section of the composite charge against a first portion of the forming mandrel using a first forming member, and forming a second section of the composite charge onto a second portion of the forming mandrel using a second forming member. Assembling the stringer components includes clamping at least two of the contoured stringer components together, installing a filler between the at least two contoured stringer components, and placing a third stringer component on top of the at least two contoured stringer components. The method may also include vacuum bagging the stringer components, and curing the stringer components. Unrolling each of the composite charges includes unrolling the composite charges onto a table at an unloading position at the forming station, and moving the table to a standby position adjacent the former. Forming each of the composite charges includes moving the table from the standby position to a forming position beneath the former, and transporting the stringer components from the forming station includes removing the formed composite charge from the table. The method further includes returning the table to the unloading position. Unrolling each of the composite charges includes unrolling each of the composite onto a table, and forming each of the composite charges includes moving the table to a forming position beneath a former, moving the former down into contact with the composite charge and vacuum forming the composite charge over a forming mandrel.

According to still another disclosed embodiment, apparatus is provided for fabricating a composite stiffener, comprising a composite ply layup table, a spool adapted to hold a length of a flexible film on which composite plies maybe laid up. The spool is positioned to allow the flexible film to be drawn from the spool onto the layup table. The apparatus further includes a transportable roll located adjacent the layup table on which the flexible film and composite plies thereon may be rolled up. The layup table includes first and second opposite ends, and the continuous length of flexible film includes a supply of the flexible film located at the first and of the layup table. The transportable roll is located at the second end of the layup table. The apparatus may further comprise an automated composite material machine movable over the layup table for laying up composite material on the flexible film. In one variation, the apparatus may further include a reconfigurable mandrel support, and a mandrel removably mounted on the mandrel support on which the composite plies may be formed. The apparatus may also include a configurable former over the mandrel support having the mandrel mounted thereon. The former includes a charge support adapted to support a composite charge and place the composite charge on the mandrel. The former also includes a first forming member for clamping and forming the composite charge over a first section of the mandrel, and a second forming member for forming the composite charge over a second section of the mandrel.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

Figure 1:
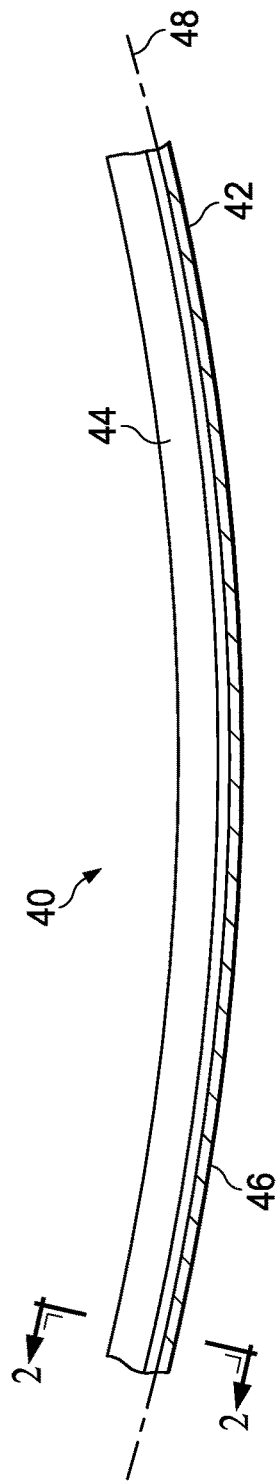
FIG. 1 is an illustration of a side elevational view of a composite laminate blade-type stringer produced according to the disclosed embodiments.

The disclosed embodiments relate to a method and apparatus for producing composite laminate stiffeners, particularly those that are contoured along their length. For example, referring to FIGS. 1-3, a composite laminate stiffener in the form of a blade-type stringer 40 comprises a flat base 42 having a contour 46 along its length that is adapted to match an outer skin (not shown) of a wing or fuselage, and a central blade 44, also contoured along its length. The stringer 40 may comprise multiple assembled components (FIG. 3), such as a pair of right angle components 50 arranged back-to-back and a cap 52. Each of the right angle components 50 comprises a pair of legs 50a, 50b intersecting along an outside radius edge 50c. In the illustrated example, an additional component comprising a composite filler 54, sometimes referred to as a "noodle", fills a void between the cap 52 and the outside radius edges 50c of the right angle components 50. It is to be understood that the stringer 40 shown in FIGS. 1-3 is merely illustrative of a wide range of contoured composite laminate stiffeners and structural members that may be produced according to the disclosed method and related apparatus.

Figure 3:
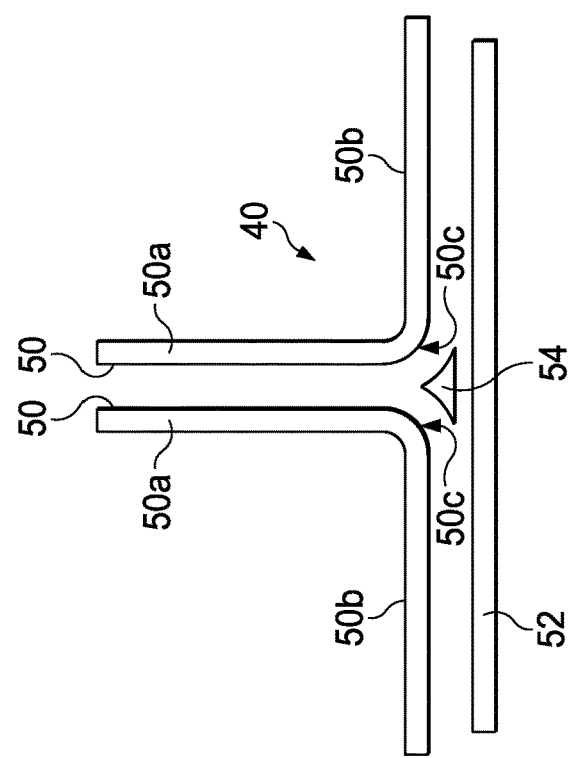
FIG. 3 is an illustration similar to FIG. 2 but exploded to show the individual components of the stringer.
Figure 2:
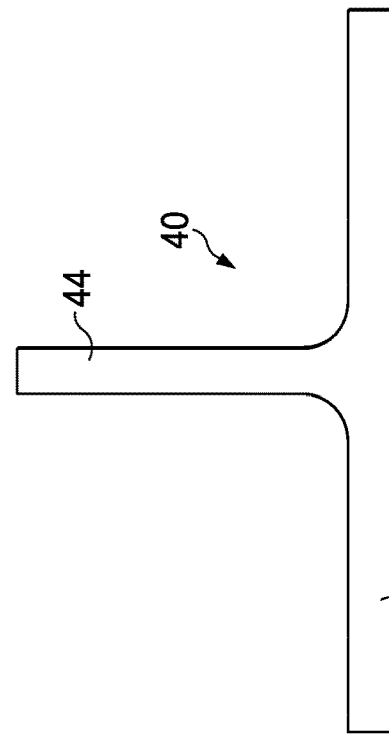
FIG. 2 is an illustration of a sectional view taken along the line 2-2 in FIG. 1.
Figure 4:
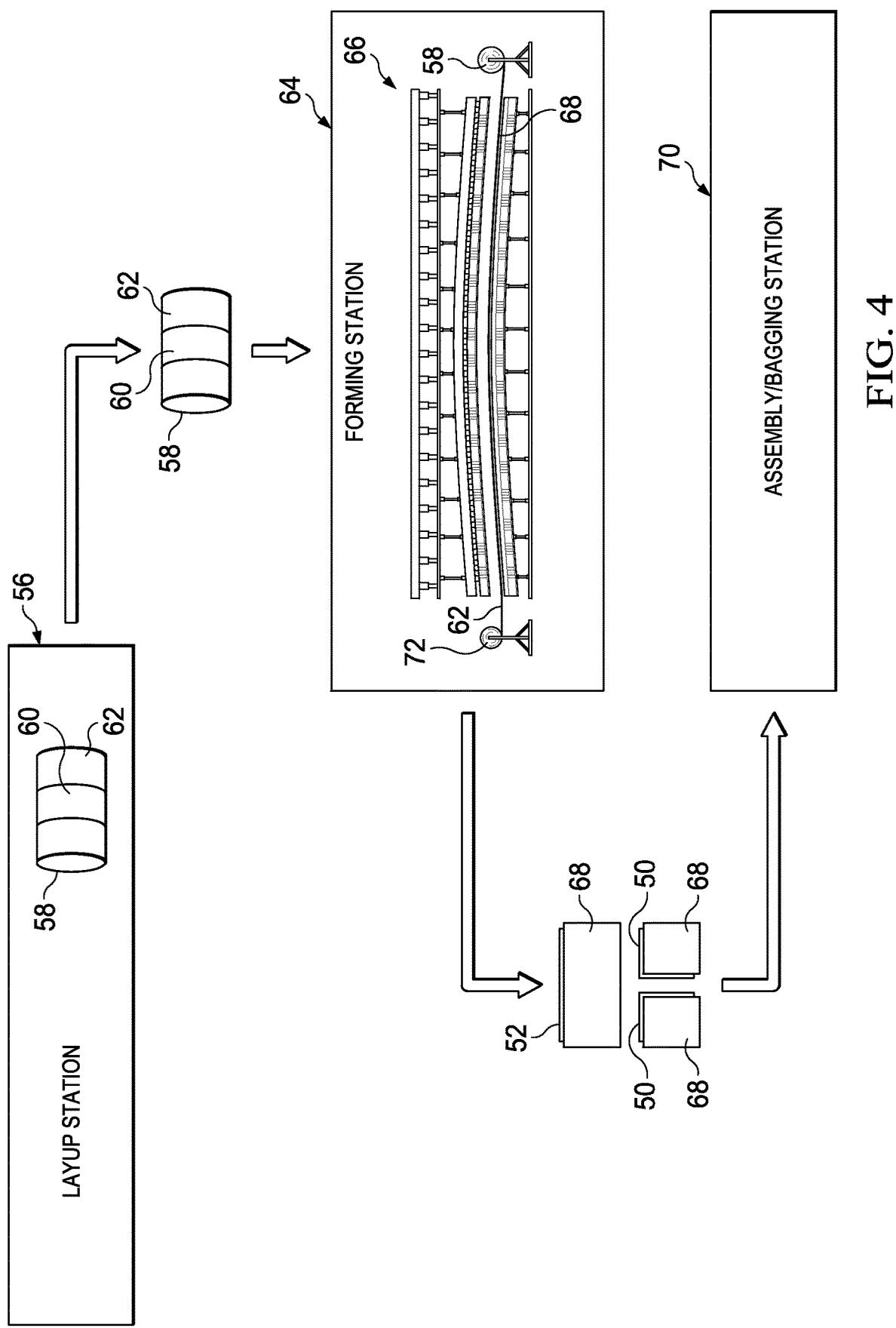
FIG. 4 is an illustration of a combined block and diagrammatic view of a method of producing composite laminate stiffeners according to the disclosed embodiments.

Attention is now directed to FIG. 4 which diagrammatically illustrates a method of laying up and assembling components of a composite laminate structure, such as the components 50, 52 shown in FIG. 3 that are assembled to form the composite laminate stringer 40 shown in FIGS. 1 and 2. Each of the components 50, 52 is produced by laying up and forming a corresponding, multi-ply composite charge 60. Each of the composite laminate charges 60, comprising one or more composite plies such as a prepreg, is assembled at a layup station 56 by laying up the plies on a section of a continuous length of flexible film 62 supported on a substrate such as table. The layup process may be performed by an automated material placement machine (not shown in FIG. 4) that lays up each charge 60, ply-by-ply on the film 62. The charges 60, along with the film 62 are spooled onto a transportable roll 58 at the layup station 56. The roll 58, having one or more charges 60 spooled thereon, is then transported by any suitable means, to a forming station 64. In one embodiment, the roll 58 may contain all of the charges 60 necessary to produce the components of a single stringer 40, while in other embodiments the roll 58 may contain all of the charges needed to produce a plurality of the stringers 40.

The forming station 64 includes a reconfigurable former 66 and a reconfigurable forming mandrel 68. The roll 58 is positioned at one end of the forming mandrel 68, where a section of the film 62 having a charge 60 therein may be unspooled (unrolled) from the roll 58 and drawn across the length of the forming mandrel 68. Each charge 60 is then transferred onto the forming mandrel 68. The charge 60 is swept down onto the forming mandrel 68 in order to form the charge 60 to the desired cross-sectional shape and longitudinal contour. After a charge 60 has been transferred from the film 62 to the mandrel 68, the film 62 is drawn onto a take-up roll 72, thereby unrolling the next-to-be-formed charge 60. After each charge 60 is formed into a component 50 of the stringer 40, the formed component 50 along with the forming mandrel 68 are transferred, using any suitable technique such as an overhead crane (not shown), to an assembly and bagging station 70 where the components 50, are assembled and vacuum bagged, in preparation for curing. In one embodiment, the base component 52 is unrolled at the time of assembly of the components 50, 52 and placed over the two assembled components 50. In other embodiments, component 52 may be formed to the desired contour over a forming mandrel 68 at the forming station 64, and then transferred on the mandrel 68 to the assembly and bagging station 70 for assembly along with the formed components 50. From the foregoing, it may be appreciated that any number of pre-kitted composite laminate charges 60 may be efficiently laid up and transported as a group on one or more rolls 58 to one or more forming stations 64. Thus, a single layup station 56 may be employed to produce an inventory of composite charges 60 ready for forming at one or more forming stations, on an as-needed basis.

Figure 5:
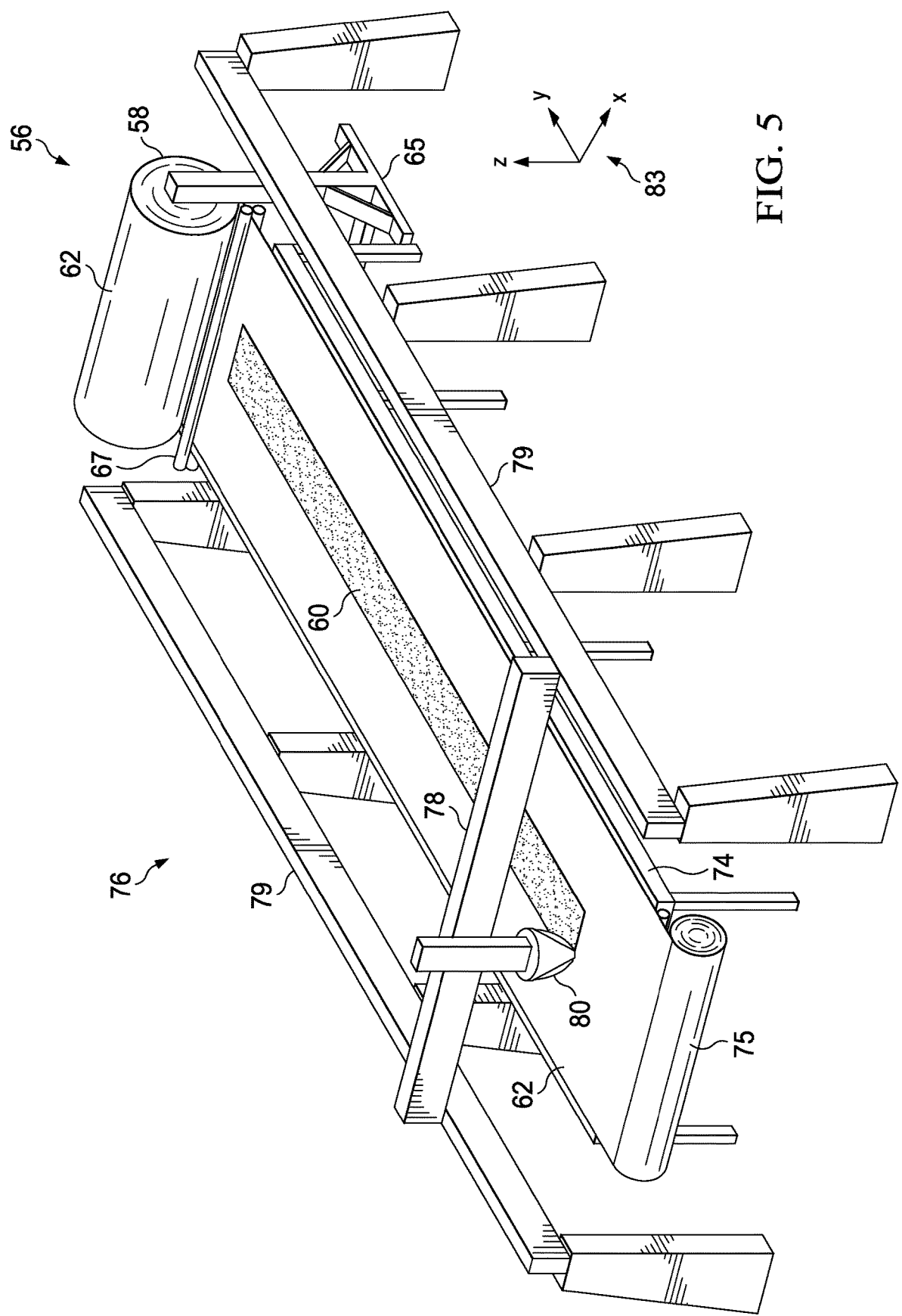
FIG. 5 is an illustration of a perspective view of a layup station showing an automated material placement machine laying up plies of a composite charge.
Figure 6:
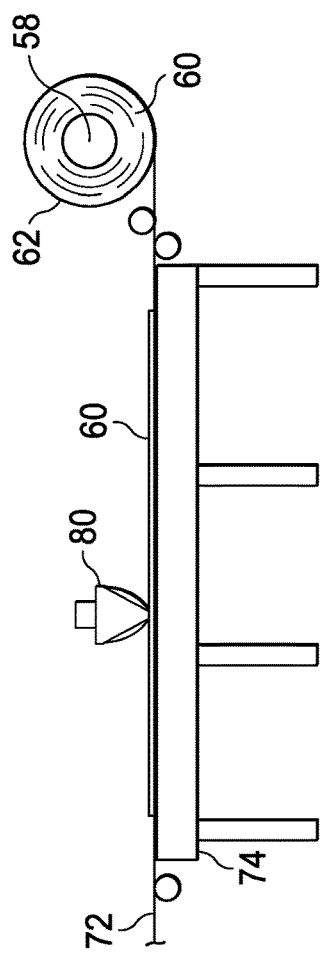
FIG. 6 is an illustration of a diagrammatic side view of the layup station shown in FIG. 5.

FIGS. 5 and 6 illustrate additional details of one embodiment of the layup station 56. The layup station 56 broadly comprises an automated material placement (AMP) machine 76 which automatically lays up plies of a composite charge 60 on an elongate layup table 74. The layup table 74 may include surface perforations therein and a vacuum system (both not shown) which draw down the film 62 onto the surface of the table 74 and hold the film 62 during the ply layup process. The roll is mounted on a transportable frame 65 which may be moved into position to support the roll 58 at one end of the table 74. Pinch rollers 67 may be provided to smooth any wrinkling in the film 62 before it is spooled onto the roll 58. A supply spool 75 of the film 62 is positioned at the other end of the table 74.

The AMP machine 76 may comprise, for example and without limitation, an automated fiber placement (AFP) machine for laying up composite tows, or automated tape placement (ATP) machine for laying up composite tape. The AMP machine 76 includes a composite material placement head 80 mounted on a gantry arm 78 that is the movable along rails 79 forming a gantry type manipulator. Other types of manipulators may be employed, such as an articulated arm robot (not shown), to move the material placement head 80 over the layup table 74 along X, Y and Z axes 83.

In use, film 62 is unrolled from the supply spool 75, drawn over the length of the table 74 and threaded through the pinch rollers 67 and onto the roll 58. With the film 62 held in a fixed position on the table 74 by vacuum suction, the AMP machine 76 lays up the plies of the charge 60, in registration with each other, while the film 62 is held stationary on the table 74. When layup of a charge 60 is completed, the film 62 is spooled onto the roll 58, thereby drawing a fresh length of film 62 from the supply spool 75 onto the table 74. In some embodiments however, it may be possible to begin schooling the film 62 onto the roll 58 has the charge 60 is being laid up thereon. Although not shown in the Figures, the roll 58 and/or the supply spool 75 may be automatically power operated by suitable motors and a control system (not shown), while in other embodiments, the process of spooling the film 62 on the roll 58 may be carried out manually. The process of laying up the charges 60 and spooling them onto the roll 58 is continued until all of the charges 60 needed to produce one or more of the components 50, 52 has been completed.

Figure 7:
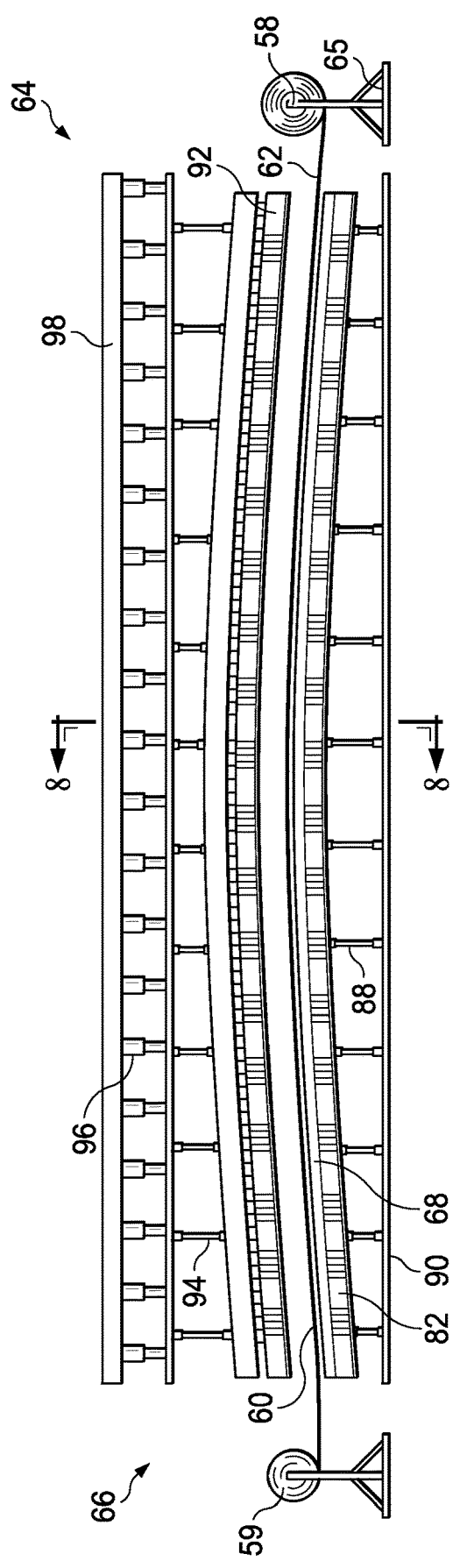
FIG. 7 is an illustration of a side elevational view of a forming station.
Figure 8:
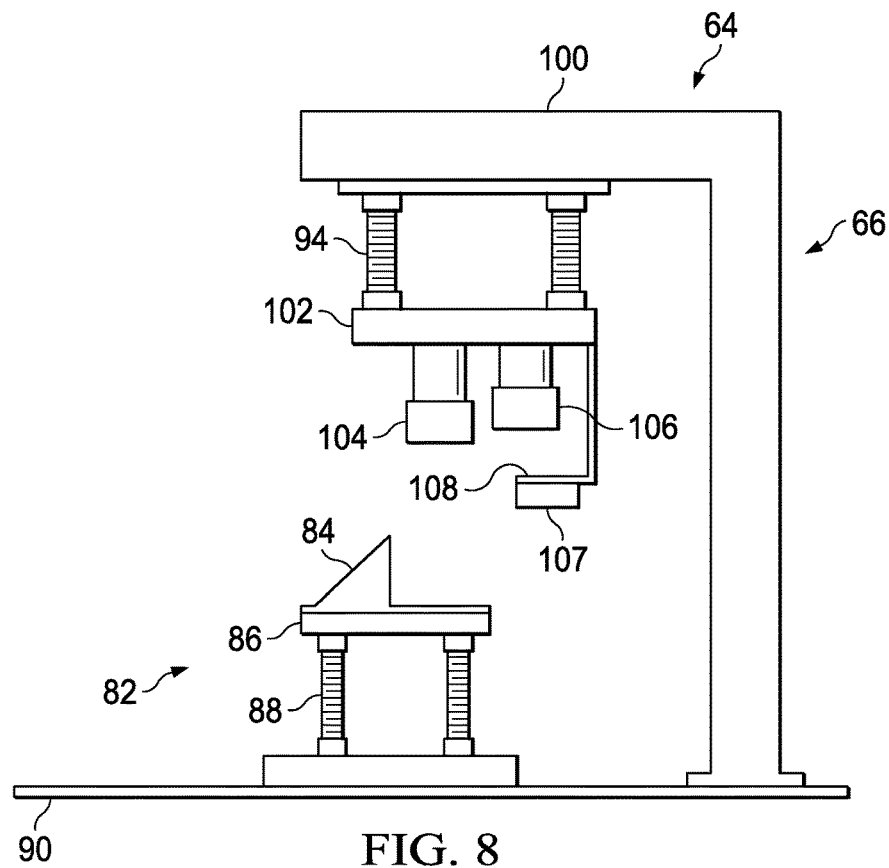
FIG. 8 is an illustration of a sectional view taken along the line 8-8 in FIG. 7.
Figure 9:
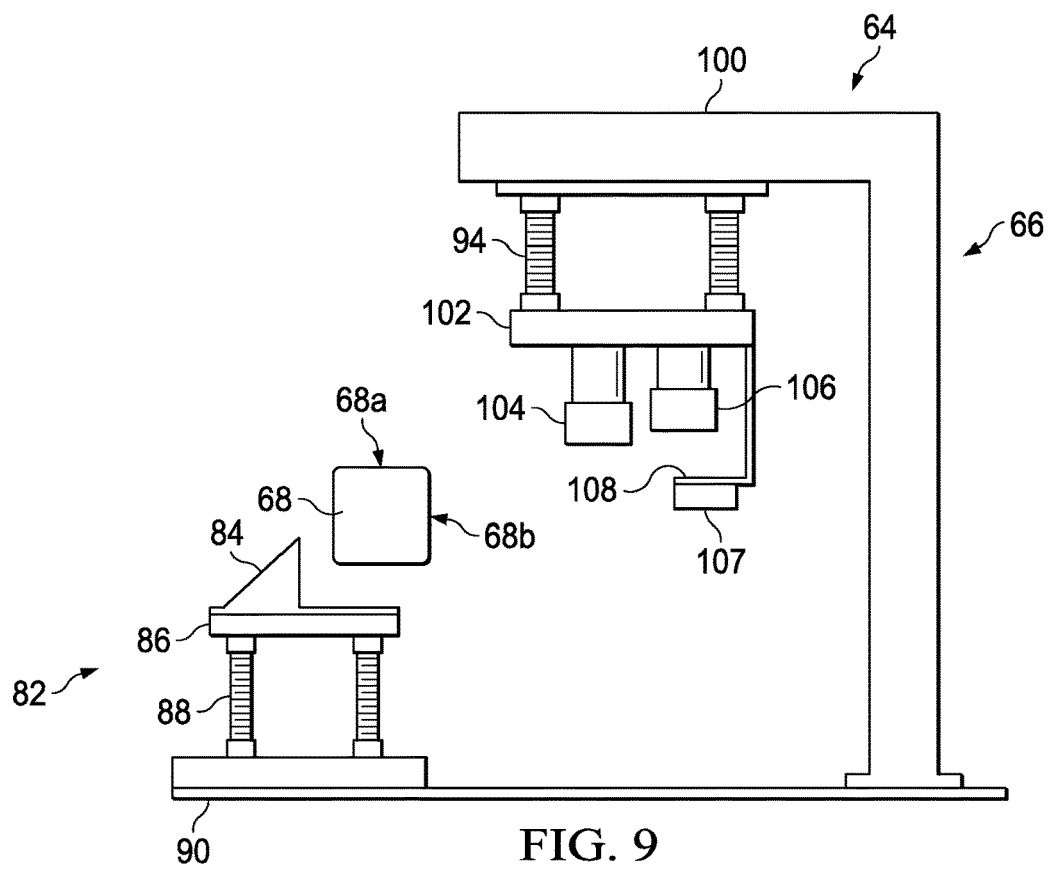
FIGS. 9-13 are illustrations similar to FIG. 8, showing the sequential steps in forming a composite charge.

Attention is now directed to FIGS. 7 and 8 which illustrate additional details of the forming station 64 which comprises a former 66 and a flexible and reconfigurable mandrel support 82 that is movable. The movable mandrel support 82 supports the forming mandrel 68 while the former 66 sweeps a composite laminate charge down over first and second surfaces 68a, 68b (see FIG. 9) of the mandrel 68. The forming mandrel 68 is flexible along its length. In one embodiment, the forming mandrel 68 may be formed of metal or a similar rigid material having a plurality of spaced apart slots or kerfs (not shown) along its length that permit the forming mandrel 68 to be bent to a desired contour. In other embodiments, the forming mandrel 68 may be formed of a material that is inherently bendable yet possess since sufficient rigidity to function as a forming tool over which a composite materials may be formed.

The mandrel support 82 comprises a base 86 on which a locating receiver 84 is mounted. The mandrel support 82 may be formed of any suitable materials capable of supporting the mandrel 68 in a fixed position, yet reconfigurable to any desired contour corresponding to the contour of a composite laminate component to be formed. In one embodiment, the mandrel support 82 may be slotted along its length to permit it to be bent to a desired contour. When a forming mandrel 68 is loaded onto the mandrel support 82, the base 86 supports the weight of the mandrel 68, while the locating receiver 84 locates the forming mandrel 68 in a desired position on the base 86 relative to the former 66. The mandrel support 82 is mounted on a vertically adjustable supports 88, such as jack screws, that are adjustable, thereby allowing the contour of the mandrel support 82 to be vertically adjusted along its length. The adjustable supports 88 may be supported on a factory floor 90, or similar underlying supporting surface.

Referring to FIG. 8, in one embodiment, the former 66 comprises a forming head 102 supported beneath a gantry 100 by pneumatic cylinders 94 which are capable of vertically displacing the head 102. The gantry 100 suspends of the head 102 above the mandrel support 82. A pair of laterally spaced, block-like forming members 104, 106 comprising, for example and without limitation, nylon, are mounted on the head 102. In one embodiment, one of the forming numbers 106 may be offset slightly higher than the other forming member 104, for purposes that will become apparent. In some embodiments, depending upon the configuration of the mandrel 68, each of the forming members 104, 106 may be articulated to allow the forming member 104, 106 to adjust and conform to the surface geometry of the mandrel 68.

A charge support 108 secured to and extending the downwardly from the head 102 supports a composite charge 60 until ready for placement on the forming mandrel 68. Optionally, a heater 107, such as, without limitation an electric coil is secured to the bottom of the charge support 108 in order to heat and thereby soften the charge 60 in preparation for forming. As will be discussed below, the forming members 104, 106, driven by the pneumatic cylinders 94, sweep a composite charge down onto and over the mandrel surfaces 68a, 68b (FIG. 9), thereby forming one of the components 50, 52 of the stringer 40. The former 66 is reconfigurable along its length to substantially match the contour of the stringer components being formed. For example, the gantry 100, the head 102 and forming members 104, 106 may be either segmented or may consist of individual components along the length of the forming station 64 to allow the former 66 to substantially match the contour of the forming mandrel 68.

Figure 10:
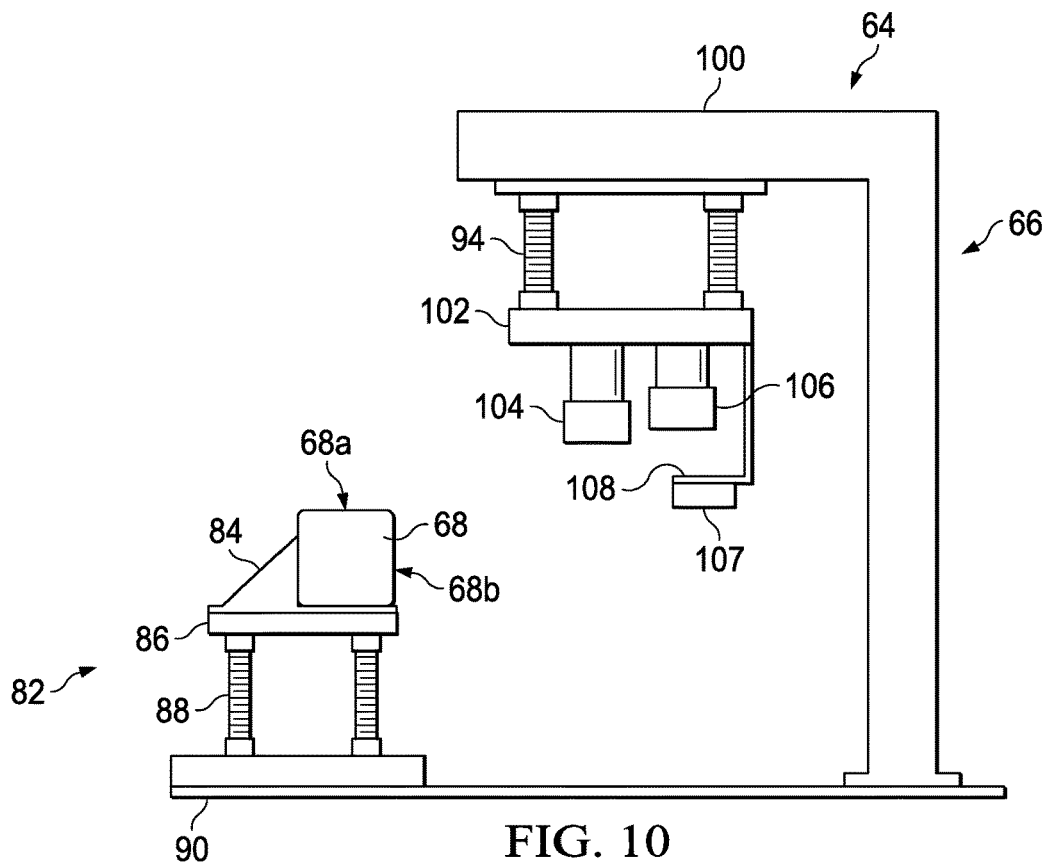

Attention is now directed to FIGS. 9-13 which diagrammatically illustrate the sequence of operations used to form a composite charge 60 to the desired shape and contour. Beginning with FIG. 9, the mandrel support 82 is adjusted to the desired contour along its length, following which a forming mandrel 68 is placed on the mandrel support 82 and is adjusted to match the contour of the mandrel support 82. The receiver 84 on the base 86 serves as a stop to locate the mandrel 68 on the base 86. Then, as shown in FIG. 10, the forming mandrel 68 is locked in its contoured position on the mandrel support using any suitable mechanism, such as clamps (not shown).

Figure 11:
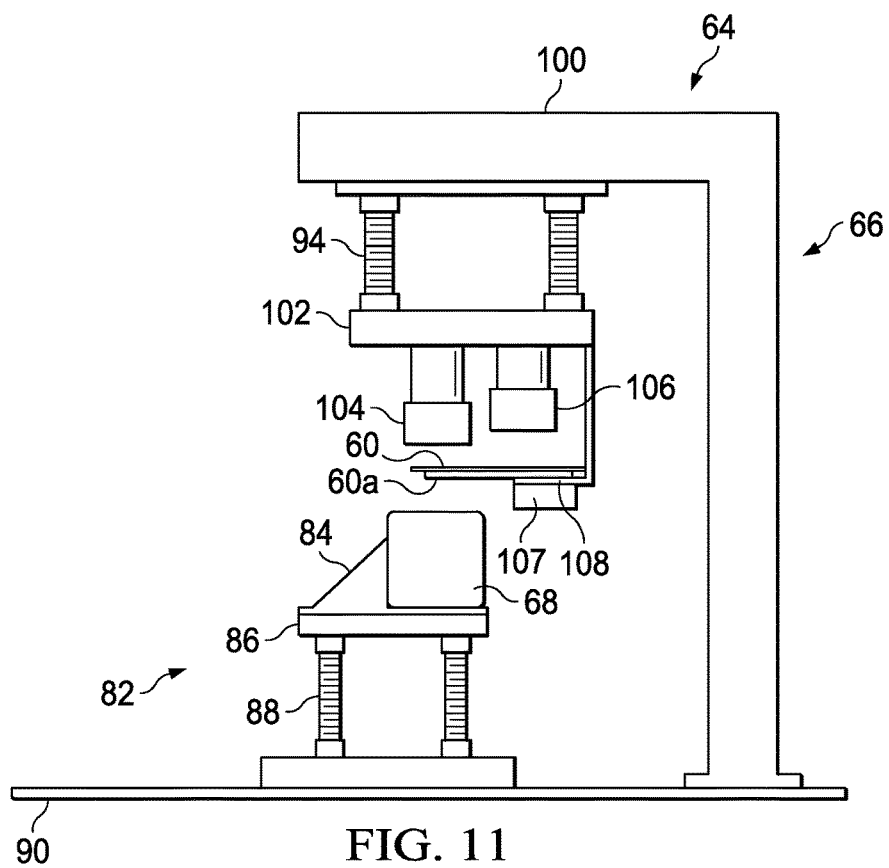
Figure 12:
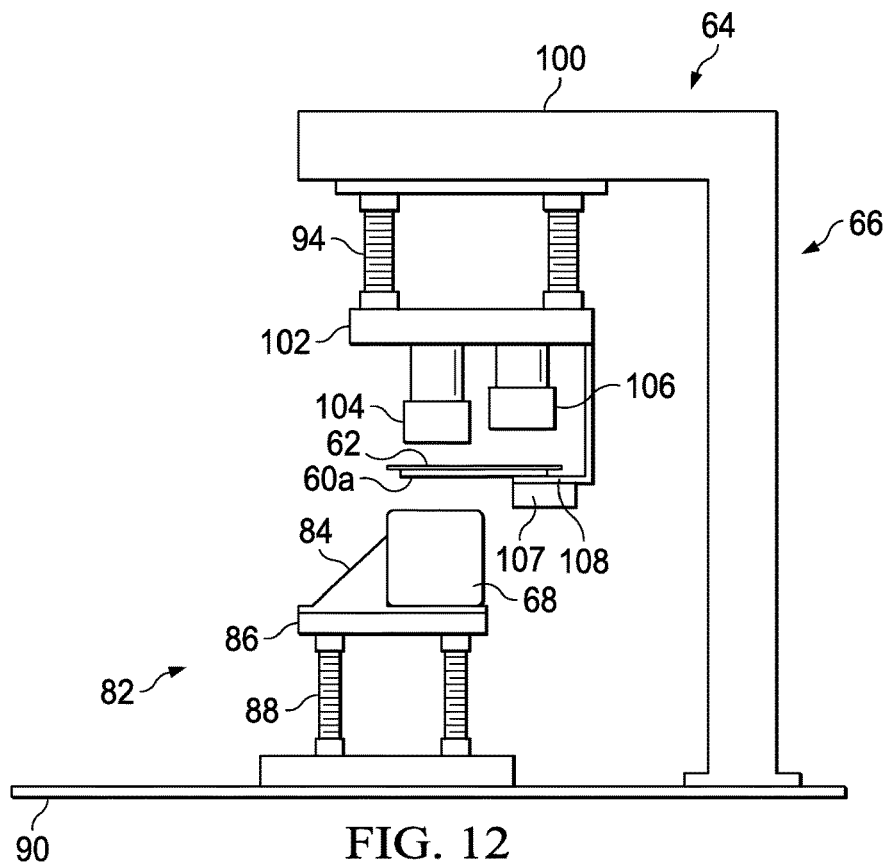
Figure 13:
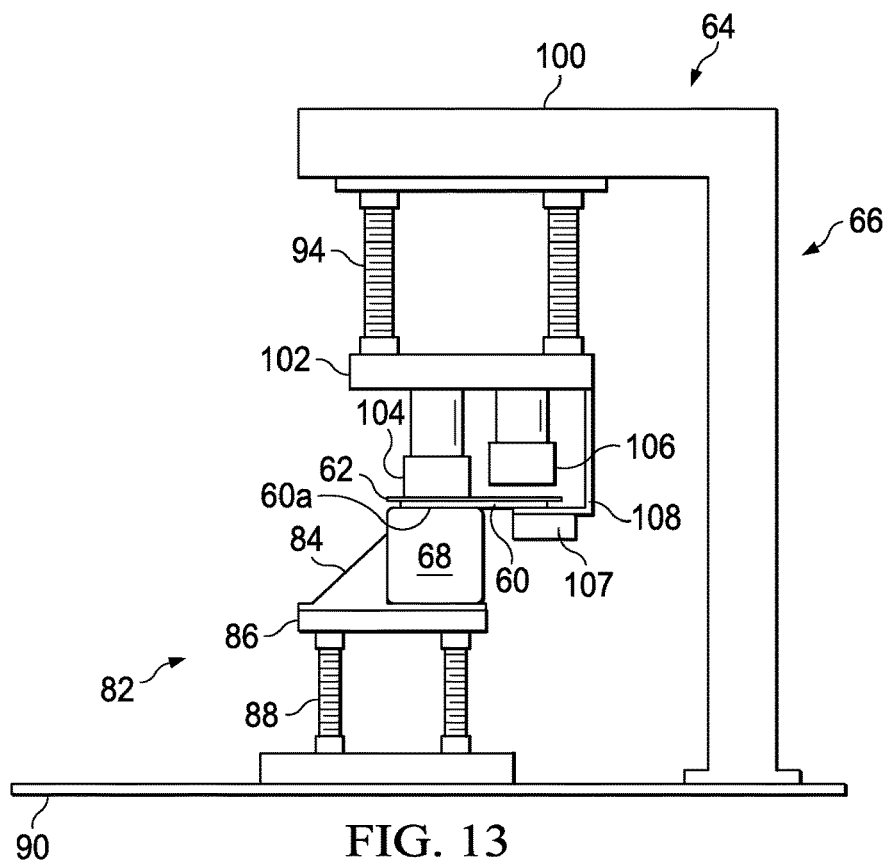

Next, as shown in FIG. 11, the mandrel support 82 is moved into position beneath the gantry 100, such that first and second mandrel surfaces 68a, 68b are respectively aligned beneath the forming members 104, 106. The composite charge 60 along with the underlying film 62 is drawn off of the roll 58 and transferred onto the charge support 108, such that a lateral portion 60a of the charge 60 overhangs an edge of the charge support 108. Optionally, the composite charge 60 may be heated on the charge support 108 using the heater 107 to soften the charge 60 to facilitate forming. Referring to FIG. 12, the charge support 108 is then lowered, and the charge 60 is aligned with the forming mandrel 68. Next, as shown in FIG. 13, the contour of the former 66 is adjusted to match that of the forming mandrel 68, and the charge 60 is adjusted, if needed, so that it is aligned with both the former 66, and the underlying the forming mandrel 68.

Figure 14:
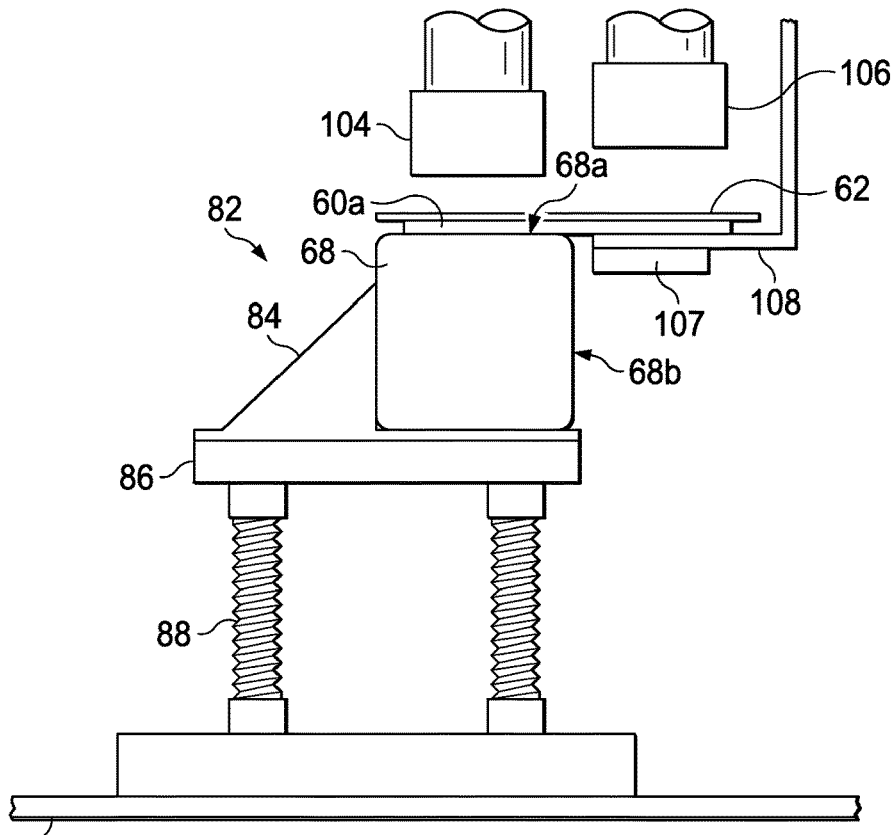
FIGS. 14-18 are illustrations of an end view of the forming mandrel and forming members, sequentially illustrating in greater detail the forming of a composite charge using the former shown in FIGS. 8-13.
Figure 15:
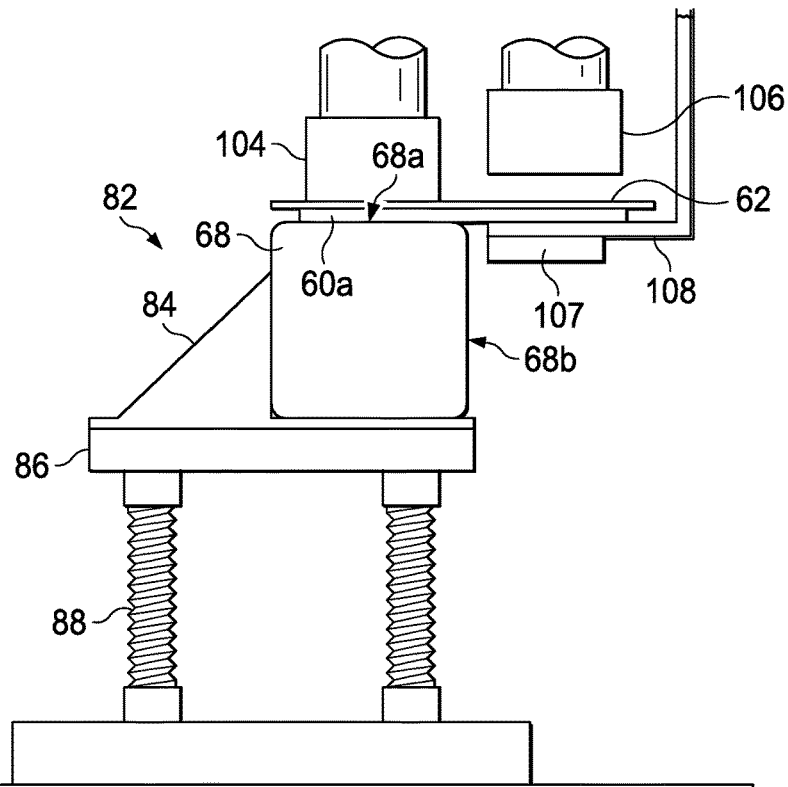
Figure 16:
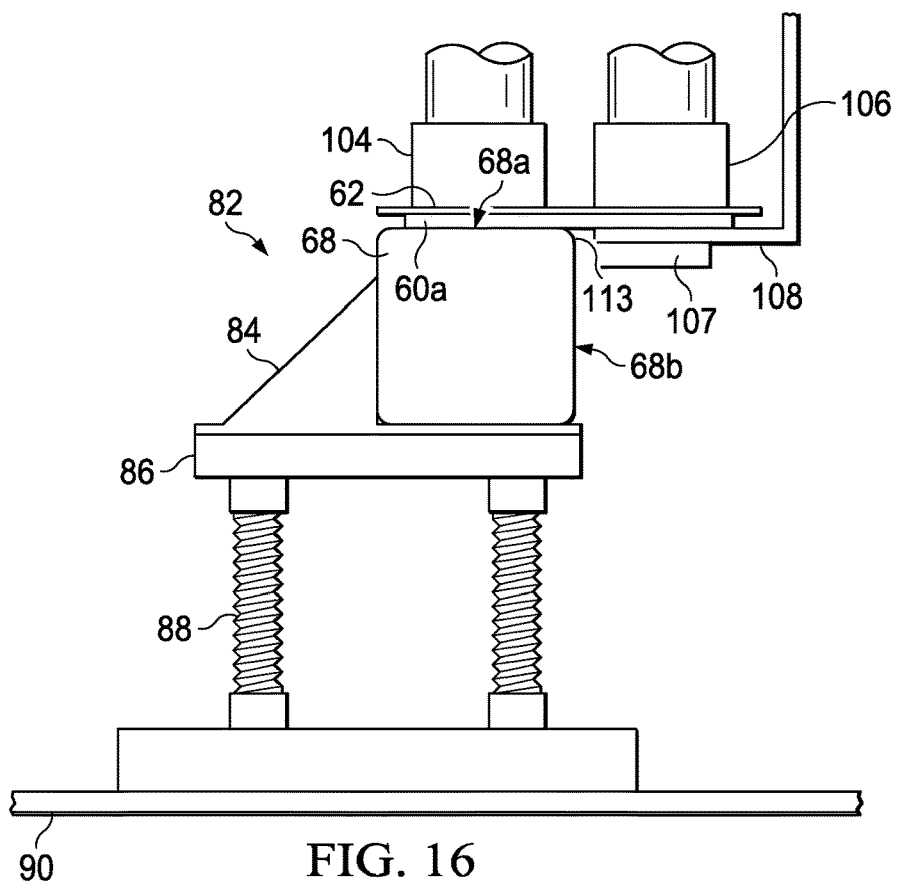
Figure 17:
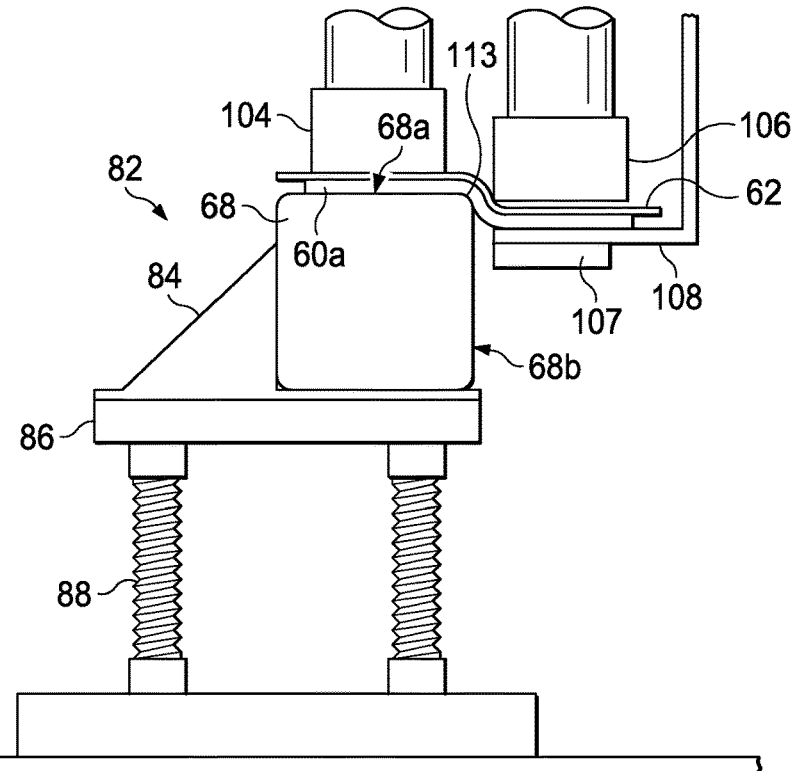
Figure 18:
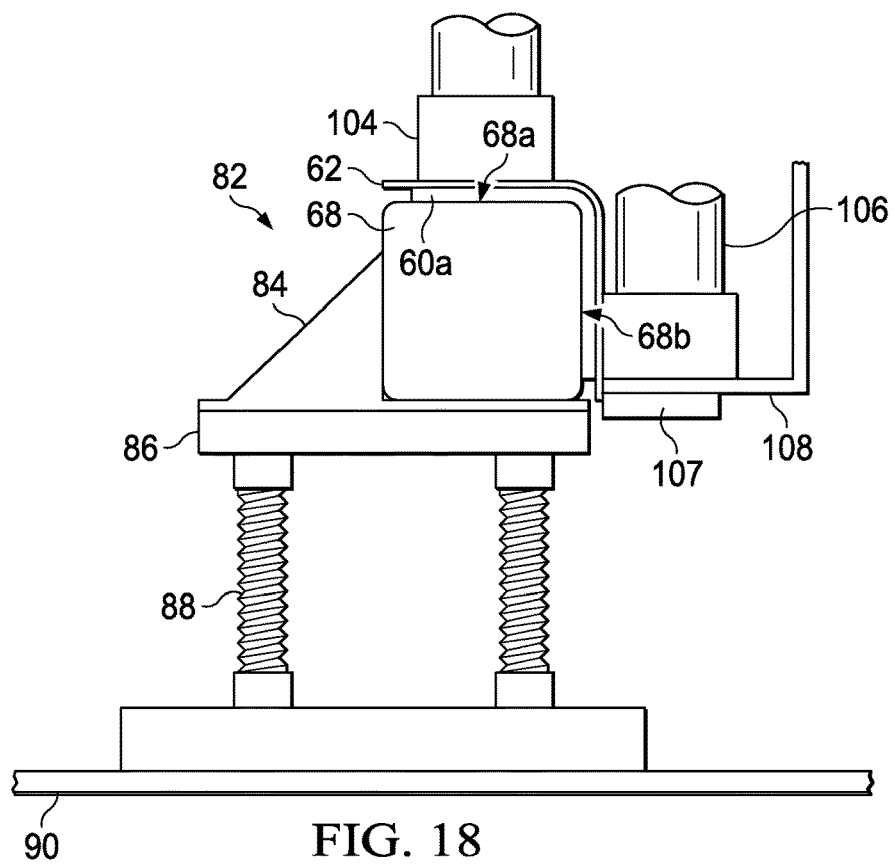

Attention is now directed to FIGS. 14-18 which sequentially illustrate forming of the composite charge 60 on the forming mandrel 68 at the forming station 64. As shown in FIG. 14, the charge 60 is adjusted as needed to locate it on the forming mandrel 68, and may be heated in this position, if desired. The head 102 (FIG. 13) is lowered by the pneumatic cylinders 94, bringing forming member 104 into contact with the composite charge 60. Force applied by the pneumatic cylinders 94 cause the forming member 104 clamp the overhanging portion 60a of the charge against the first surface 68a the mandrel 68, thereby fixing and maintaining the alignment of the composite charge 60 on the forming member 104 throughout the remainder of the forming process. Referring to FIG. 16, with a portion 60a of the charge 60 clamped against the first surface 68a of the mandrel 68, continued downward movement of forming member 106 brings it into contact with the remainder of the charge 60. As shown in FIG. 17, the forming member 106 sweeps the charge 60 down over a radius edge 113 between the two mandrel surfaces 68a, 68b, forming the charge 60 down onto mandrel surface 68b of the mandrel 68. FIG. 18 shows the charge 60 having been fully formed by the forming member 104, 106 against mandrel surfaces 68a, 68b.

Figure 19:
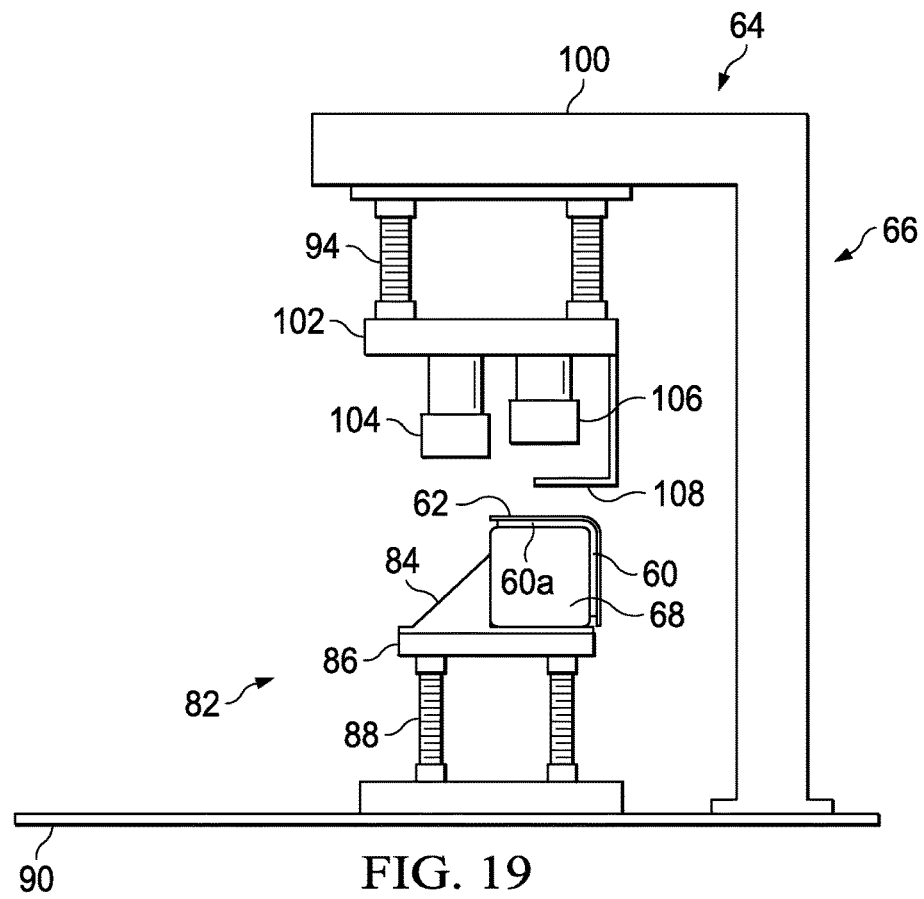
FIGS. 19-21 are illustrations similar to FIG. 8, but showing the sequential steps in preparing the formed composite charge for transport to an assembly and bagging station.
Figure 20:
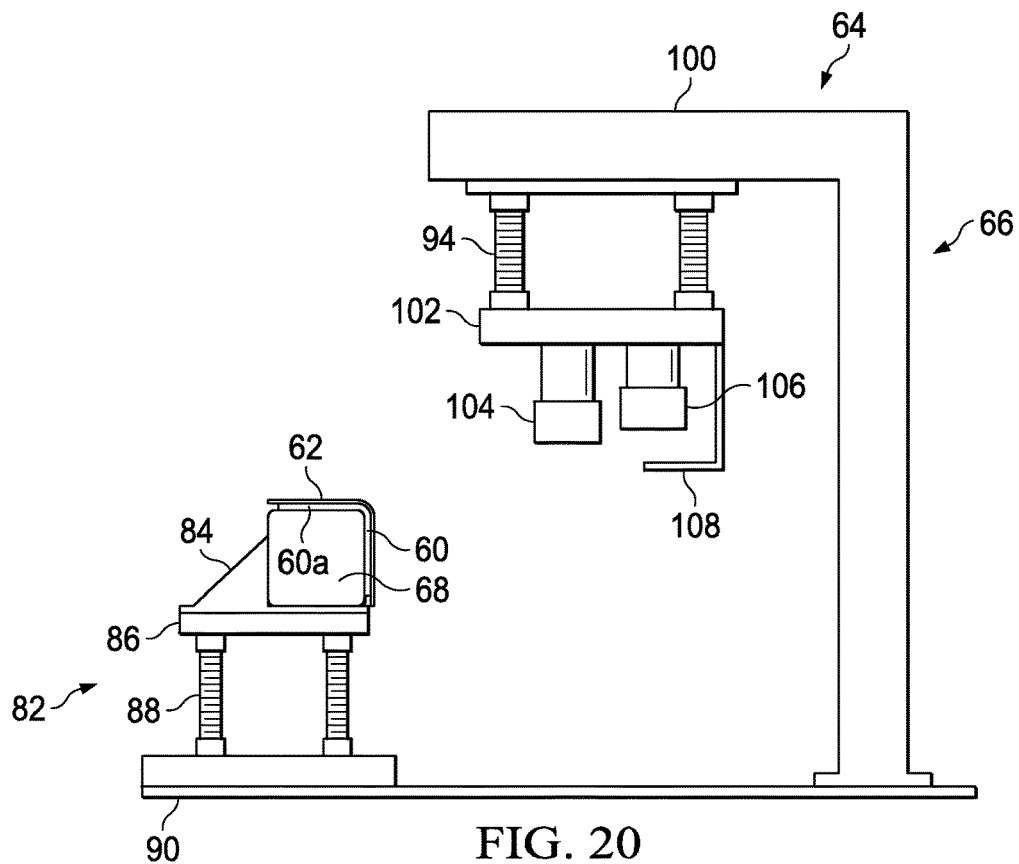
Figure 21:
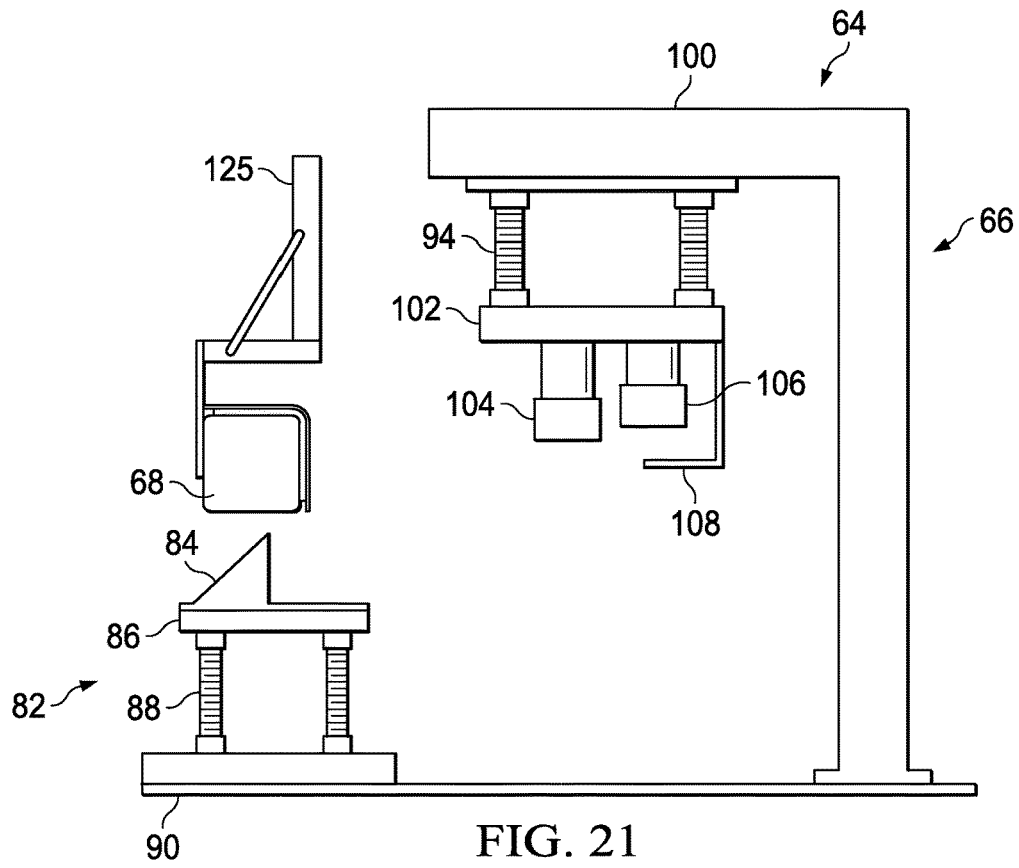

Referring now to FIG. 19, with the charge 60 having been fully formed, the head 102 moves upwardly, disengaging the forming member 104, 106 from the fully formed charge 60. Then, as shown in FIG. 20, the mandrel support 82 is moved away from the former 66, thereby providing the clearance needed to allow the mandrel 68 to be removed from the mandrel support 82. Next, shown in FIG. 21, a crane pickup 125 is attached to the mandrel 68, allowing the crane to unload the mandrel 68 and transfer it to the assembly/bagging station 70 (FIG. 4).

In the embodiment shown in FIGS. 8-18, the forming mandrel 68 is held in an orientation that causes the composite charge 60 to be formed down over the second mandrel surface 68b after having been formed and clamped against the first mandrel surface 68a. However, the sequence in which the individual portions of the charge 60 may be altered, if desired, by supporting the forming mandrel 68 in a different angular orientation. For example, referring to FIG. 22, the forming mandrel 68 may be held within a notch 87 in the receiver 84, such that the mandrel surfaces 68a, 68b are respectively oriented at differing angles $\phi_1$, $\phi_2$ relative to the plane 125 of the composite charge 60 before forming is commenced. Consequently, during the forming sequence, forming member 104 begins sweeping a portion of the charge 60 over the angularly oriented mandrel surface 68a, following which forming member 106 begins sweeping the remainder of the charge 60 over the angularly oriented mandrel surface 68b.

Figure 23:
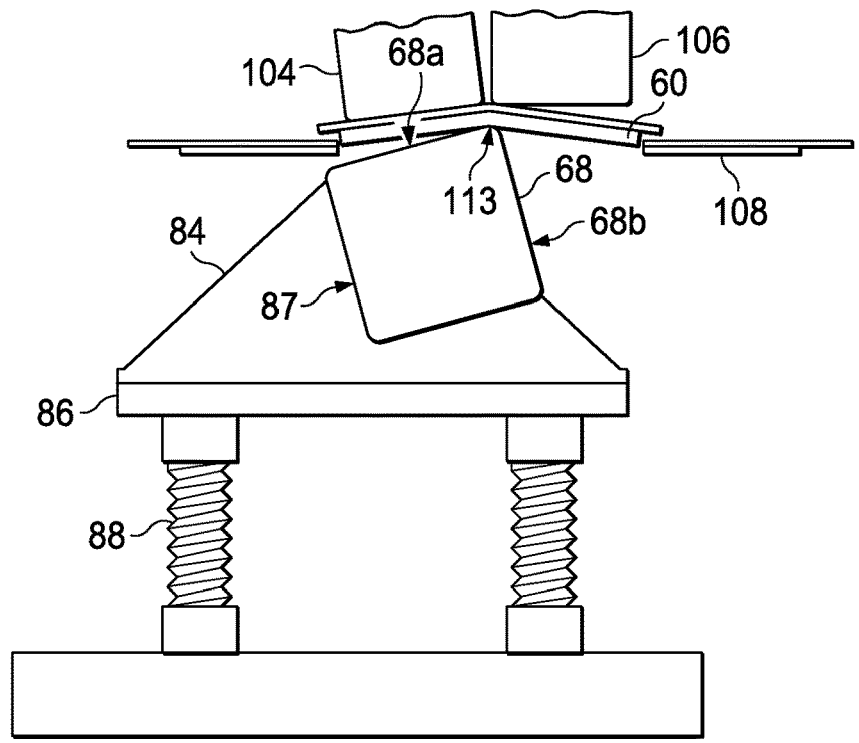
Figure 24:
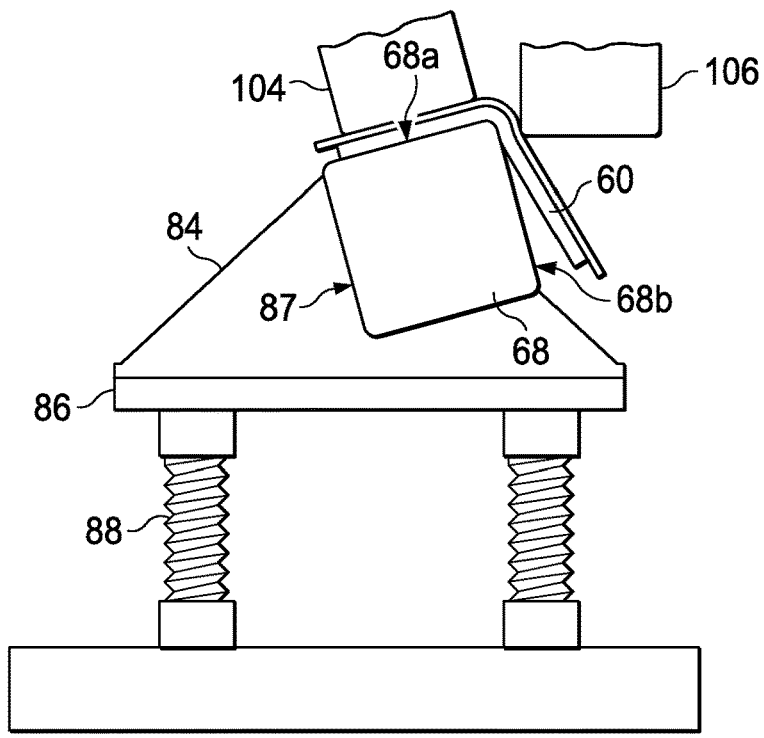
Figure 25:
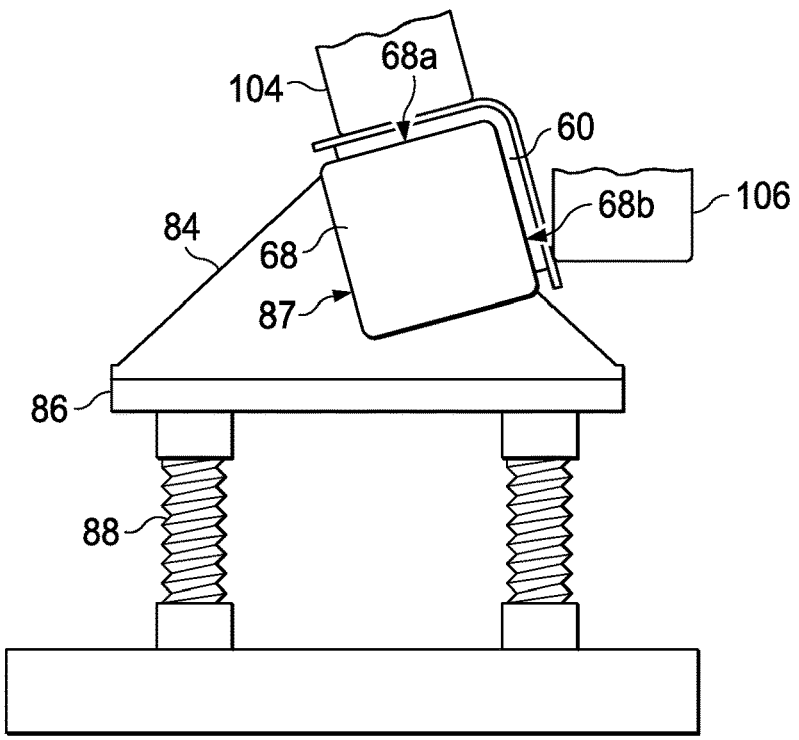

The forming sequence described immediately above is illustrated in more detail in FIG. 23-26. In FIG. 23, downward movement of forming members 104, 106 initially forces the charge 60 into contact with the radius edge 113, at which point forming member 104 begins sweeping the charge 60 down onto the mandrel surface 68a, until the forming member 104 clamps the charge 60 against the mandrel 68 as best seen in FIG. 24. FIG. 24 also shows the forming member 106 beginning to sweep the charge 60 down onto mandrel surface 68b, until the charge 60 is fully formed against mandrel surface 68b as shown in FIG. 25.

Figure 22:
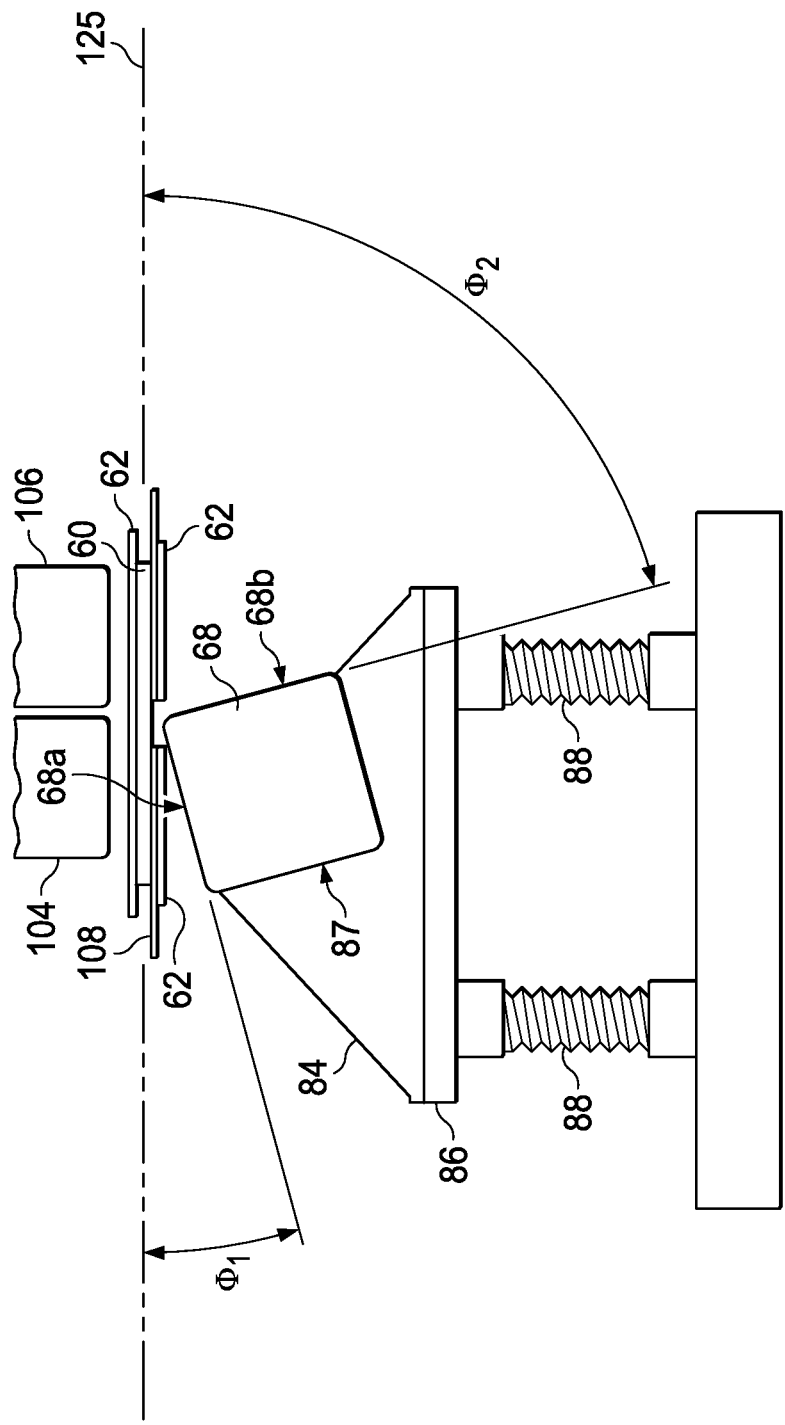
FIGS. 22-25 are illustrations similar to FIGS. 14-18, but sequentially showing the forming of a composite charge on a forming mandrel having an alternate orientation
Figure 26:
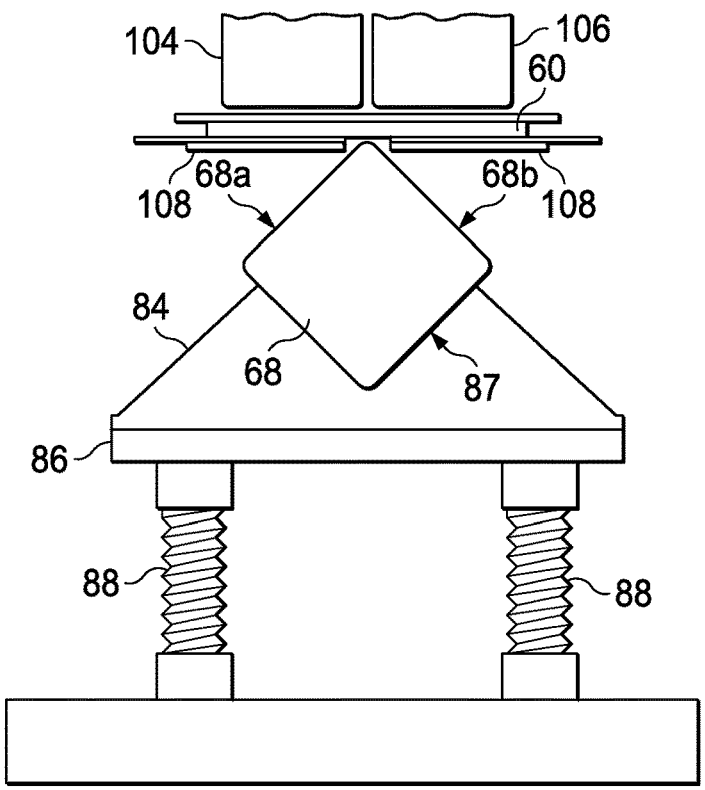
FIG. 26 is an illustration similar to FIG. 22, but showing another possible mandrel orientation.

FIG. 26 illustrates an alternate embodiment in which the mandrel 68 has another angular orientation that results in the charge 60 being simultaneously swept over the two mandrel surfaces 68a, 68b at substantially the same rate. In this embodiment, the two mandrel surfaces 68a, 68b have angular orientations relative to the plane 125 of the charge 60 that are substantially equal but opposite to each other. In the embodiment of FIG. 22, the forming members 104, 106 initially force the charge 60 into contact with the radius edge 113 of the mandrel 68, following which the two forming members 104, 106 sweep the charge 60 down onto and over the mandrel surfaces 68a, 68b.

Figure 27:
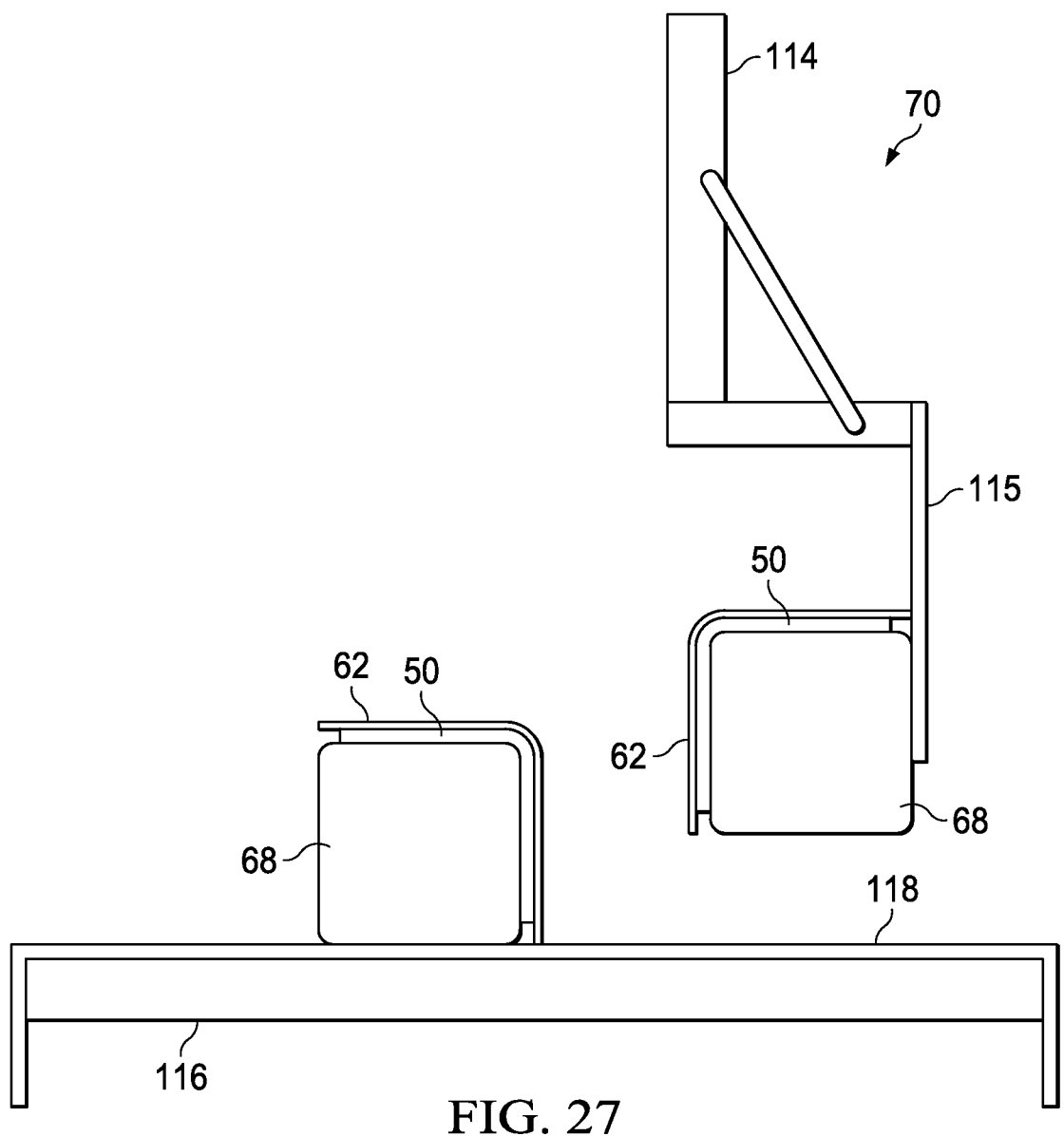
FIGS. 27-31 are illustrations of an end view of the assembly station, sequentially illustrating the assembly and bagging of the stringer components.
Figure 28:
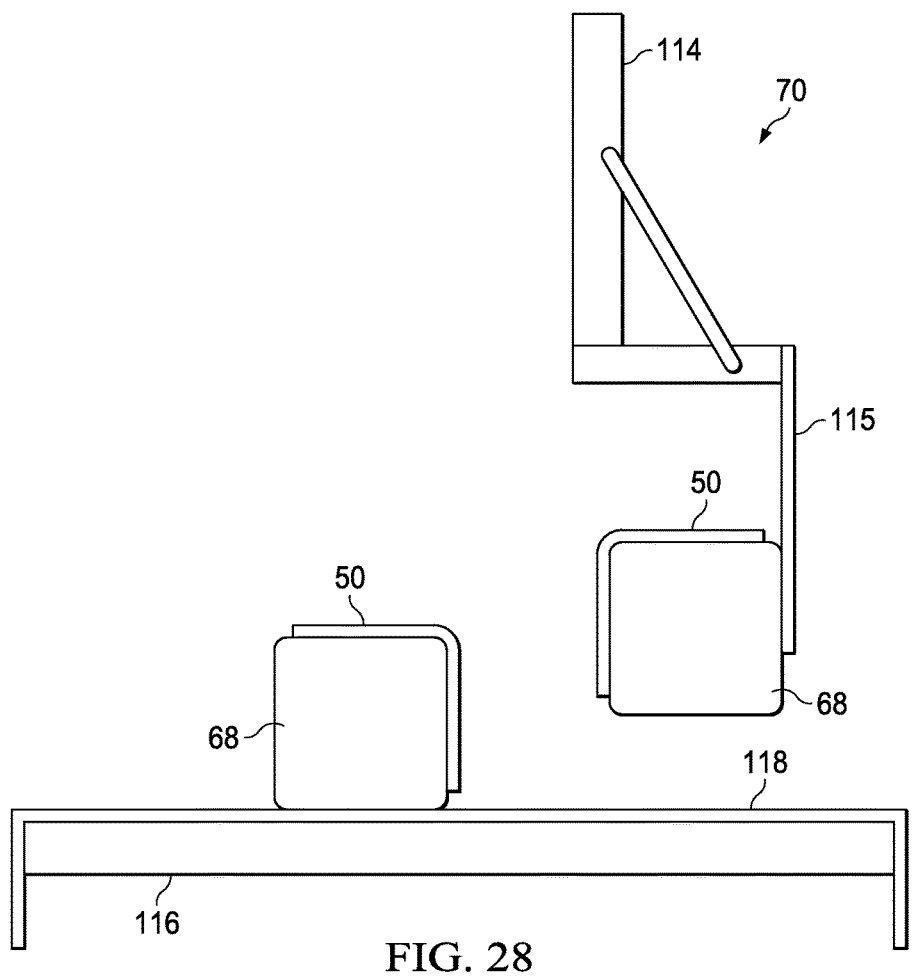
Figure 29:
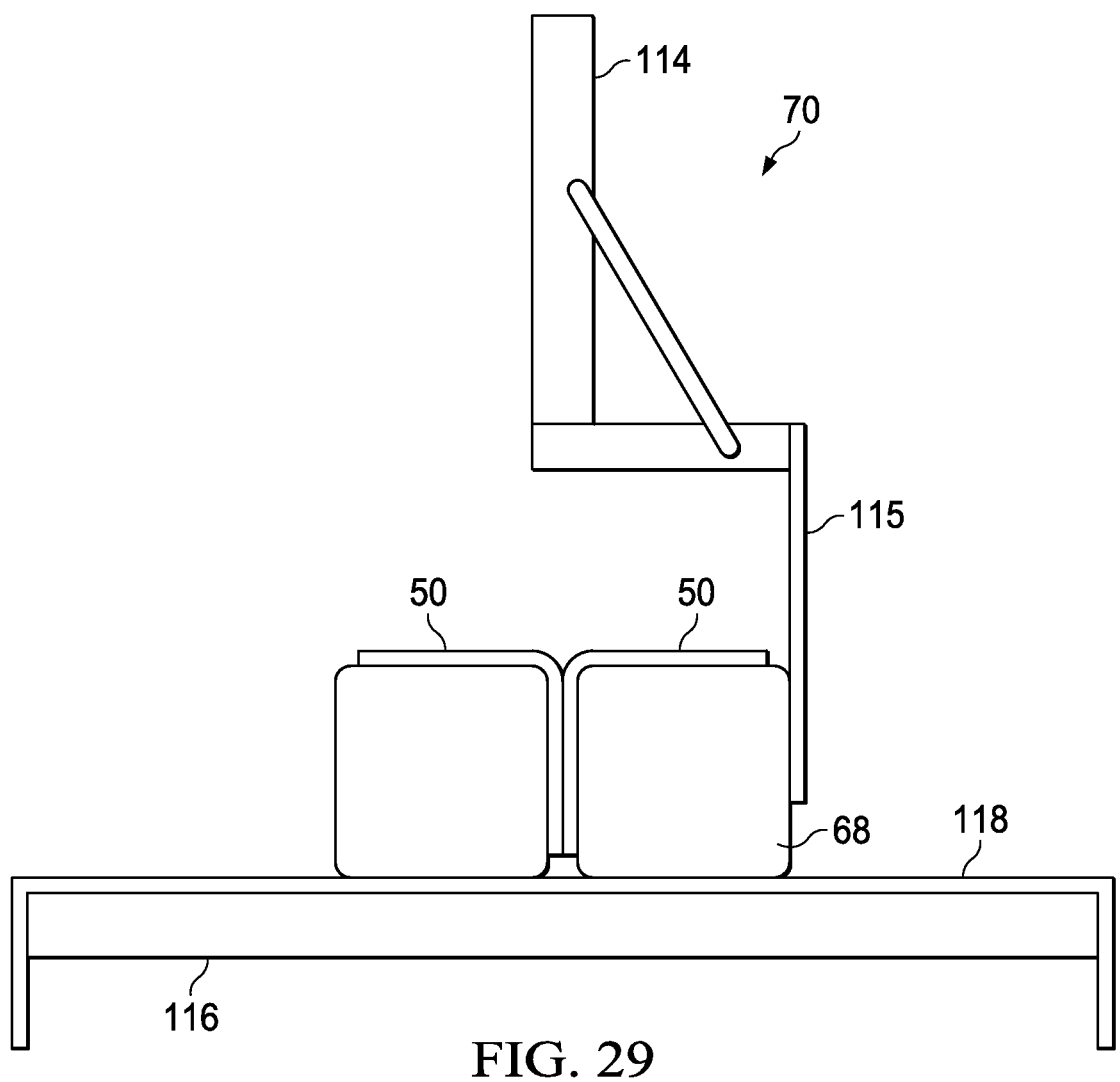
Figure 30:
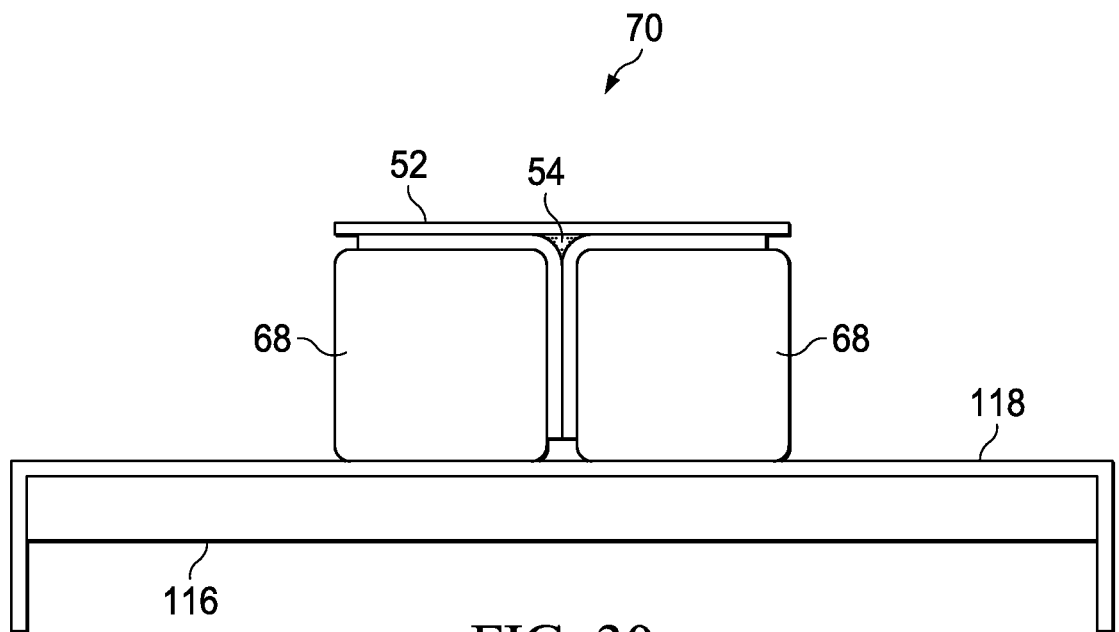
Figure 31:
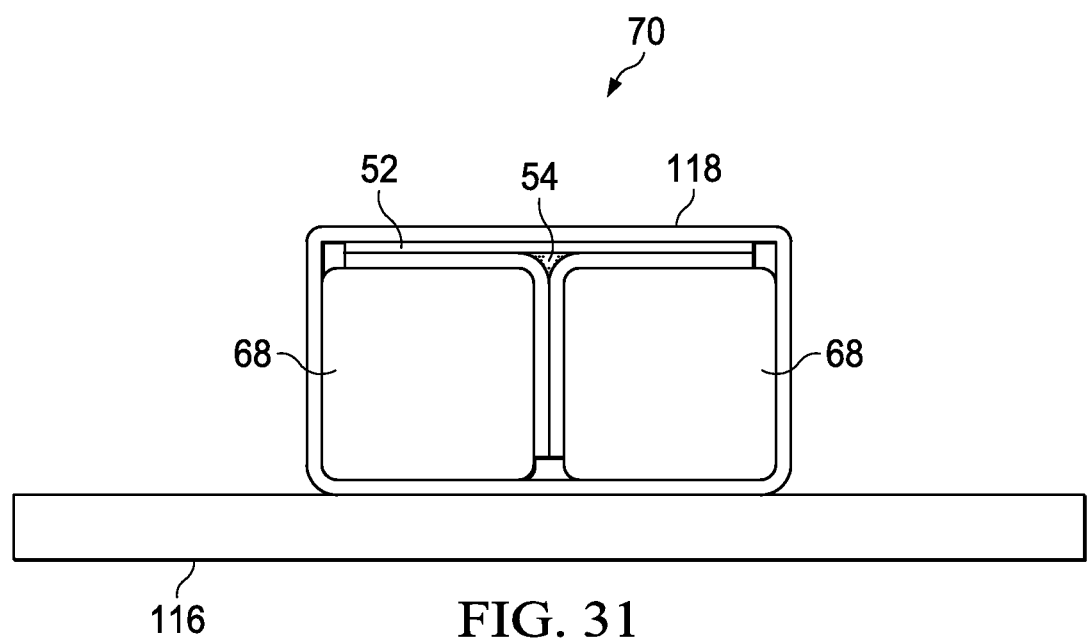

FIG. 27 illustrates the crane pickup 114 transferring one of the mandrels 68 having a fully formed right angle component 50 thereon to the assembly/bagging station 70 where another mandrel 68 with a component 50 thereon has been placed on the table 116 covered with a bagging film 118. At this point, the film 62 remains on the component 50. Then, as shown in FIG. 28, the film 62 is removed. Next, as shown in FIG. 29, adhesive (not shown) is applied to the radius edges 50c (FIG. 3) of each of the right angle components 50, following which the two mandrels 68 are clamped together, thereby bringing the two right angle components 50 into face-to-face contact with each other. Referring to FIG. 30, a radius filler 54, formed of adhesive or composite material, is placed in the void between the radius edges 50c (FIG. 3). The cap component 52, which may or may not be pre-formed to the desired contour, is positioned in place and optionally, a caul plate (not shown) is placed over the cap 52 in preparation for bagging. Then, as shown in FIG. 31, the stringer 40 is bagged by drawing the bagging film 118 around the assembly of the two mandrels 68 and assembled components 50, 52, 54. The assembled stringer 40 is then cured using autoclave or out-of-autoclave processing, in which the stringer 40 is subjected to a combination of heat and pressure which compacts and cures the stringer 40.

Figure 32:
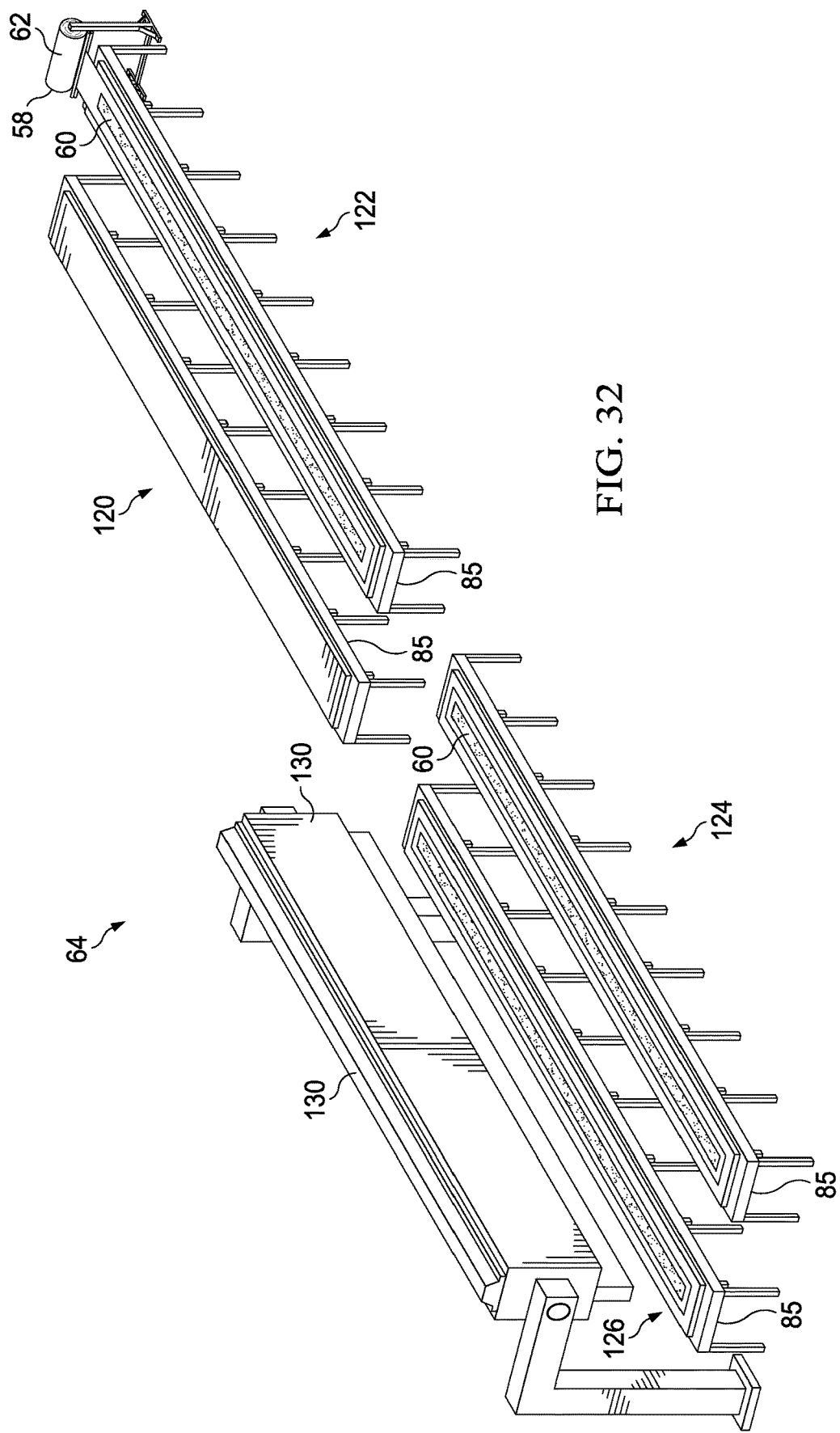
FIG. 32 is an illustration of a perspective view of an alternate embodiment of the forming station.

Attention is now directed to FIG. 32 which illustrates a stringer forming station 64 employing certain principles of the embodiments discussed above. The roll 58 containing the rolled-up charges 60 is transported from the layup station 56 (FIG. 4) to a first position 122 at the forming station 64 where it is located at one end of a transportable forming table 85. For example, although not shown in the Figures, the forming table 85 may have wheels that allow it to be moved from place-to-place within the forming station 64. The film 62 along with a charge 60 is pulled from the roll 58 and drawn out onto the forming table 85. The film 62 is then cut from the roll 58 and trimmed as necessary. Optionally, the forming table 85 may be transported to a standby position 124 adjacent a former 130, where the charge 60 may be heated in preparation for forming, using for example, a portable infrared heater (not shown) or heating coils (not shown) integrated into the forming table 85.

Next, the forming table 85 is moved to another position 126 at the forming station 64, aligned beneath a former 130, which is discussed below in more detail. The charge 60 is formed into one of the components 50, 52 following which, the forming table 85 is moved to a fourth position 120 at the forming station 64 where the formed component 50, 52 may be unloaded and transferred to the assembly/bagging station 70 FIG. 4). After the components 50, 52 are removed from the forming table 85, the forming table 85 is moved back to its starting position 122, ready to receive the next charge 60 drawn from the roll 58.

FIGS. 33-37 illustrate an embodiment of a former 130 that may be used in the forming station 64 shown in FIG. 32. The former 130 is positioned above the forming table 85 which has an overlying, flexible forming membrane 138 thereon. The forming membrane 38 may comprise, without limitation, silicone rubber. The former 130 includes an adapter 132 for mounting the former 132 on a press (not shown) or other manipulator. The former 130 also includes a frame 135 having surrounding sidewalls 137 forming an enclosure 141, and a pair of longitudinally extending, laterally spaced block-like forming mandrels 68 inside the frame 135. The sidewalls 137 include seals 136 that are adapted to be drawn against of the forming membrane 138 to form a vacuum tight enclosure 141. Although not shown in the Figures, the former 130 is adapted to be coupled with a vacuum source for drawing a vacuum within the enclosure 141.

Figure 33:
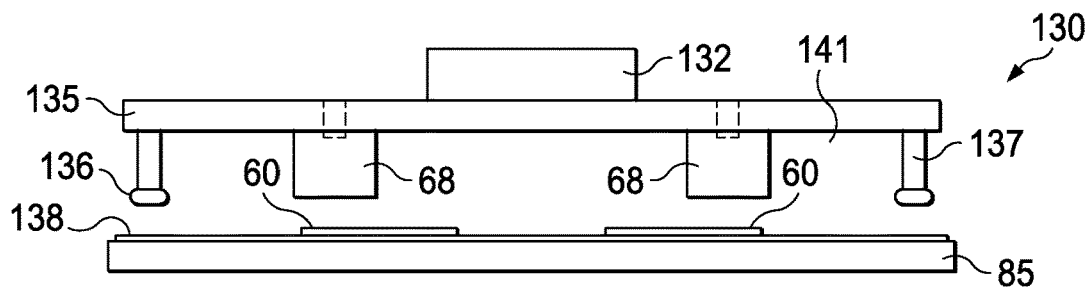
FIGS. 33-37 are illustrations of an alternate embodiment of the former, showing the sequential steps of forming two composite charges into components of the stringer.
Figure 34:
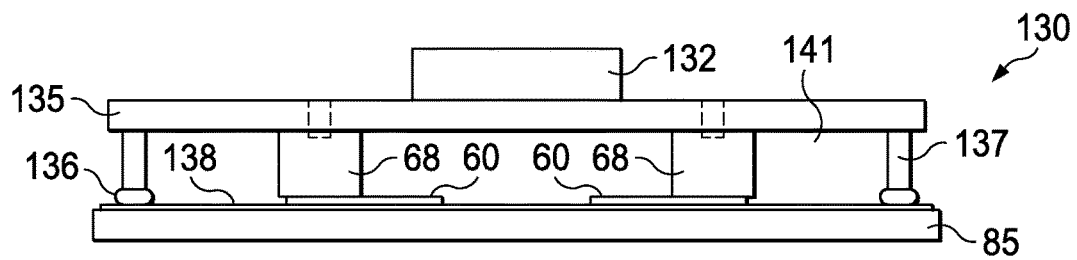
Figure 35:
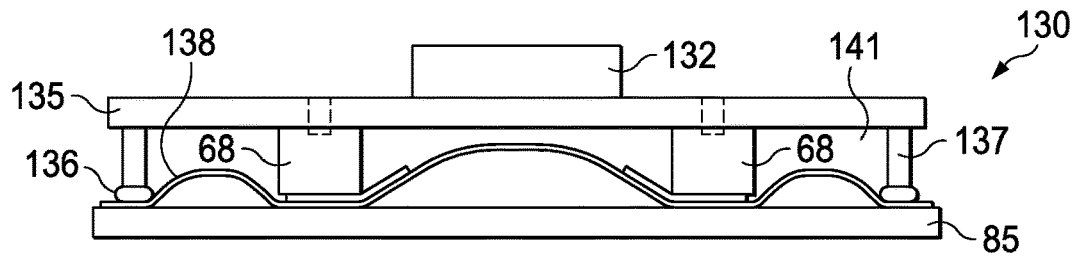
Figure 36:
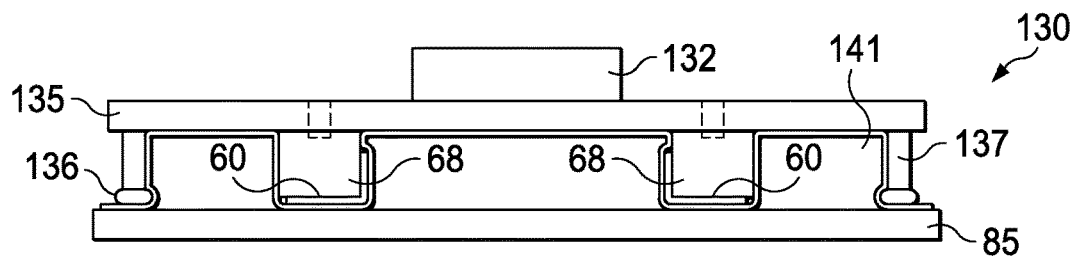
Figure 37:
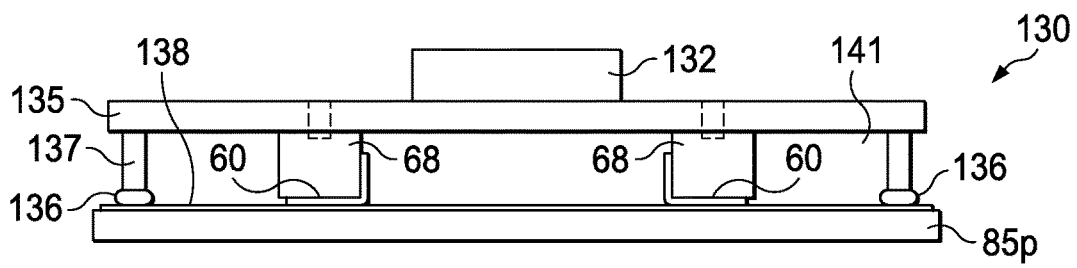

FIG. 33 shows former 130 lowered into proximity to the table 85 on which a pair of charges 60 have been placed in spaced apart relationship to each other. FIG. 34 shows the former 130 having been pressed down onto the table 85, causing the seals 136 to form a vacuum tight enclosure 141 around the charges 60, while the forming mandrels 68 clamp a portion of the charges 60 on the table 85. Next, as shown in FIG. 35, a vacuum is drawn within the enclosure 141, causing the membrane 138 to sweep the charges 60 upwardly against the sides of the forming mandrels 68. FIG. 36 shows the forming membrane 138 having fully formed the charges 60 into right angle shaped components 50. Referring to FIG. 37, with the charges 60 fully formed into components 50, the vacuum is released, allowing the forming membrane 138 to return to its flat position on the table 85. The former 130 may then be raised, allowing the table 85 with the formed components 50 thereon to be moved away and replaced with another table 85 having flat charges 60 thereon ready for forming.

Figures 38, 39:
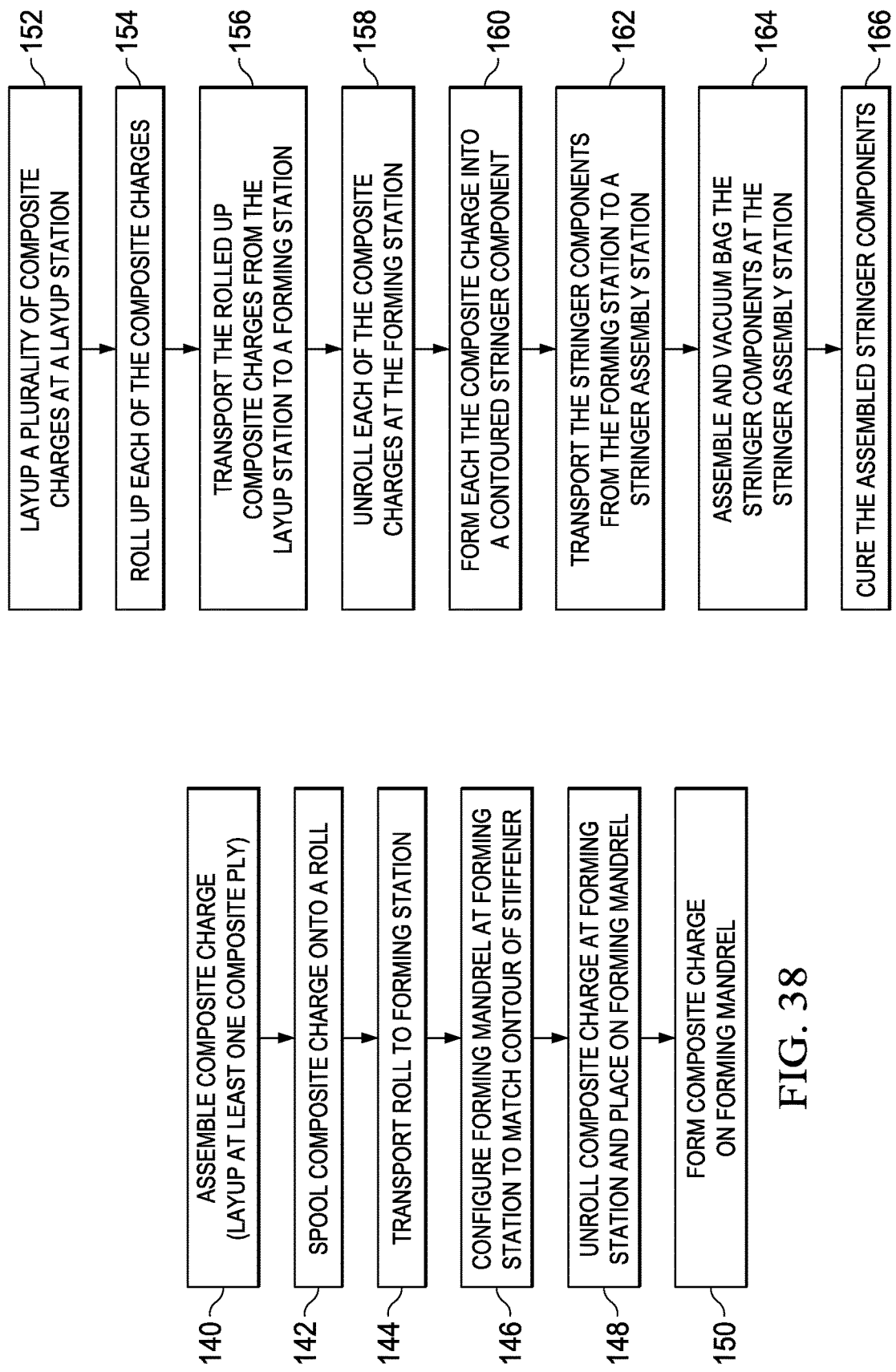
FIG. 38 is an illustration of a flow diagram of a method of producing composite laminate stiffeners.
FIG. 39 is an illustration of a flow diagram of a method of producing composite laminate stringers.

Attention is now directed to FIG. 38 which broadly illustrates the steps of forming a composite stiffener 40. Beginning at 140, a composite charge 60 is assembled, for example by laying up at least one composite ply. At 142 the composite charge 60 is spooled onto a roll 58. At 144 the roll 58 is transported to a forming station 64. At 146, a forming mandrel 68 at the forming station 64 is configured to match the desired contour of the stiffener 40. At 148, the composite charge is unrolled and placed on the forming mandrel 68. Then, at 150, the composite charge 60 is formed on the forming mandrel 68.

FIG. 39 broadly illustrates the steps of a method of fabricating a contoured composite blade stringer 40. At 152, a plurality of composite charges 60 are laid up at a layup station 56. At 154, each of the composite charges 60 is rolled up. At 156, the rolled up composite charges 60 are transported from the layup station 56 to a forming station 64. At 158, the composite charges 60 are unrolled at the forming station 64. At 160, each of the composite charges 60 is formed into a contoured composite stringer 40 component 50, 52. At 162, the stringer components 50, 52 are transported from the forming station 64 to a stringer assembly station 70. At 164, the stringer components 50, 52 are assembled and vacuum bagged at the stringer assembly station 70. At 166, the assembled stringer components 50, 52, 54 are cured.

Figure 40:
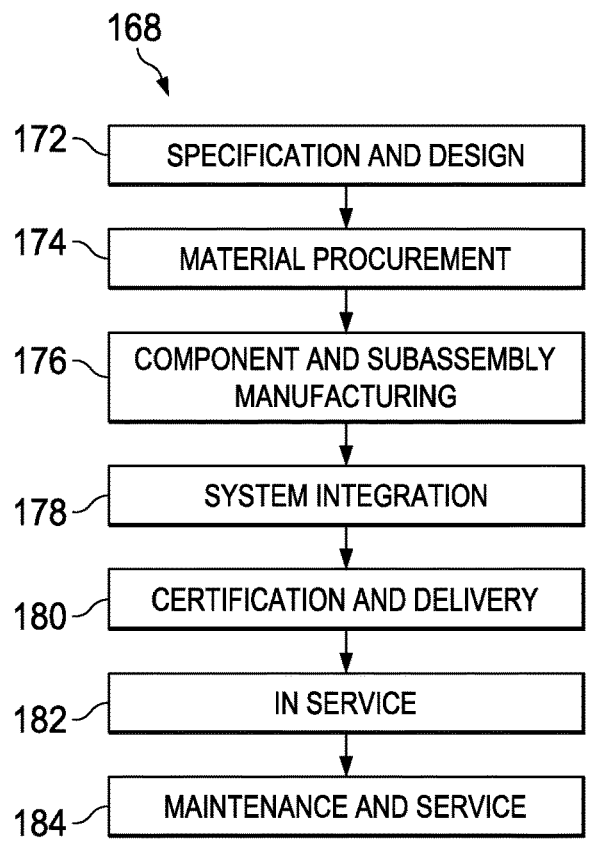
FIG. 40 is an illustration of a flow diagram of aircraft production and service methodology.
Figure 41:
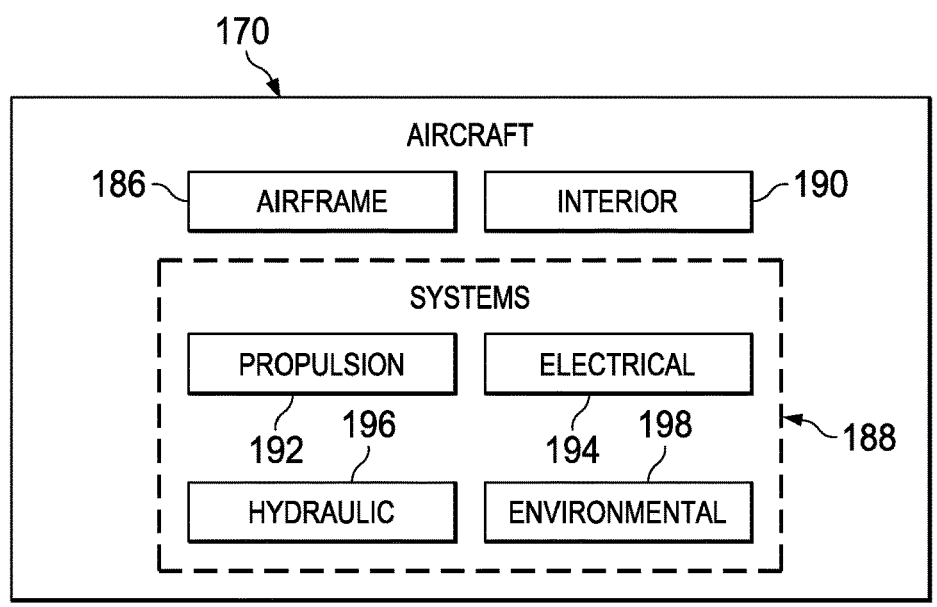
FIG. 41 is an illustration of a block diagram of an aircraft.

Embodiments of the disclosure may find use in a variety of potential applications, particularly in the transportation industry, including for example, aerospace, marine, automotive applications and other application where contoured elongate composite members, such as stringers, spars and beams, may be used. Thus, referring now to FIGS. 40 and 41, embodiments of the disclosure may be used in the context of an aircraft manufacturing and service method 168 as shown in Figure and an aircraft 170 as shown in FIG. 41. Aircraft applications of the disclosed embodiments may include, for example, without limitation, stringers, spars, beams and similar structural members. During pre-production, exemplary method 168 may include specification and design and 172 of the aircraft 170 and material procurement 174. During production, component and subassembly manufacturing 176 and system integration 178 of the aircraft 170 takes place. Thereafter, the aircraft 170 may go through certification and delivery 180 in order to be placed in service 182. While in service by a customer, the aircraft 170 is scheduled for routine maintenance and service 184, which may also include modification, reconfiguration, refurbishment, and so on.

Each of the processes of method 168 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 41, the aircraft 170 produced by exemplary method 168 may include an airframe 186 with a plurality of systems 188 and an interior 190. Examples of high-level systems 188 include one or more of a propulsion system 192, an electrical system 194, a hydraulic system 196 and an environmental system 198. Any number of other systems may be included. Although an aerospace example is shown, the principles of the disclosure may be applied to other industries, such as the marine and automotive industries.

Systems and methods embodied herein may be employed during any one or more of the stages of the production and service method 168. For example, components or subassemblies corresponding to production process 176 and 178 may be fabricated or manufactured in a manner similar to components or subassemblies produced while the aircraft 170 is in service. Also, one or more apparatus embodiments, method embodiments, or a combination thereof may be utilized during the production stages 176 and 178, for example, by substantially expediting assembly of or reducing the cost of an aircraft 170. Similarly, one or more of apparatus embodiments, method embodiments, or a combination thereof may be utilized while the aircraft 120 is in service, for example and without limitation, to maintenance and service 184.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of fabricating a contoured composite blade stringer, comprising:
   laying up a plurality of separate multi-ply composite charges in series onto a continuous flexible film at a layup station, wherein each of the separate multi-ply composite charges corresponds to a separate component of the contoured composite blade stringer, wherein each of the separate multi-ply composite charges has dimensions corresponding to the separate component of the contoured composite blade stringer;
   rolling up the continuous flexible film along with each of the plurality of composite charges onto a roll;
   transporting the roll having the plurality of composite charges thereon from the layup station to a forming station, including a plurality of forming mandrels;
   adjustably configuring a shape of a first forming mandrel of the plurality of forming mandrels to substantially match a lengthwise contour of the contoured composite blade stringer;
   unrolling a first multi-ply composite charge of the plurality of composite charges at the forming station across a length of the first forming mandrel;
   aligning the first multi-ply composite charge with the first forming mandrel;
   forming the first multi-ply composite charge over the length of the first forming mandrel and into a first contoured stringer component;
   adjustably configuring a shape of a second forming mandrel of the plurality of forming mandrels to substantially match the lengthwise contour of the contoured composite blade stringer and to substantially compliment the shape of the first forming mandrel;
   unrolling a second multi-ply charge of the plurality of the multi-ply composite charges at the forming station across a length of the second forming mandrel;
   aligning the second multi-ply charge with the second forming mandrel;
   forming the second multi-ply charge over the length of the second forming mandrel and into a second contoured stringer component that has a substantially complementary-shape relative to the first contoured stringer component;
   transporting the first forming mandrel having the first contoured stringer component thereon and the second forming mandrel having the second contoured stringer component thereon from the forming station to an assembly station; and
   assembling the first contoured stringer component and the second contoured stringer component at the assembly station to form the contoured composite blade stringer.

2. The method of claim 1, wherein laying up the plurality of separate multi-ply composite charges includes:
   unrolling the continuous flexible film onto a substrate;
   laying up separate pluralities of composite plies on the flexible film to form the plurality of separate multi-ply composite charges; and
   wherein rolling up each of the separate multi-ply composite charges includes rolling up the flexible film along with each of the multi-ply composite charges onto the roll, and transporting the rolled up multi-ply composite charges includes transporting the roll from the layup station to the forming station.

3. The method of claim 2, wherein:
   the substrate is a layup table; and
   laying up a plurality of composite charges includes unrolling the continuous flexible film from a spool located at a first end of the layup table and positioned to allow the flexible film to be drawn from the spool onto the layup table.

4. The method of claim 3, wherein:
   rolling up the flexible film along with each of the composite charges includes rolling up the flexible film and the composite charges onto the roll located at a second end of the layup table, wherein the first end and second end are opposite ends of the table.

5. The method of claim 4, wherein:
   laying up the plurality of separate composite charges includes laying up composite material onto the continuous flexible film from an automated composite material machine movable over the layup table.

6. The method of claim 1 further comprising:
configuring a former to substantially match the contour of the contoured composite blade stringer; and
wherein forming the first multi-ply composite charge over the length of the first forming mandrel and into a first contoured stringer component comprises forming the first multi-ply composite charge on the first forming mandrel using the former.

7. The method of claim 6, wherein:
adjustably configuring a shape of a first forming mandrel of the plurality of forming mandrels to substantially match a lengthwise contour of the contoured composite blade stringer includes:
adjusting a mandrel support to generally match the contour of the contoured composite blade stringer;
loading the first forming mandrel onto the mandrel support; and
configuring the first forming mandrel to substantially match the contour of the mandrel support.

8. The method of claim 7, wherein forming the first multi-ply composite charge over the length of the first forming mandrel includes:
locating the mandrel support having the first forming mandrel thereon beneath the former;
clamping a first section of the first multi-ply composite charge against a first portion of the first forming mandrel using a first forming member of the former; and
forming a second section of the first multi-ply composite charge onto a second portion of the first forming mandrel using a second forming member of the former.

9. The method of claim 8
wherein assembling the first contoured stringer component and the second contoured stringer component at the assembly station to form the contoured composite blade stringer comprises compressing the first contoured stringer component and the second contoured stringer component between the first forming mandrel and the complementary-configured second forming mandrel.

10. The method of claim 1, wherein assembling the first contoured stringer component and the second contoured stringer component at the assembly station to form the contoured composite blade stringer includes:
clamping together the first forming mandrel having the first contoured stringer component thereon and the second forming mandrel having the second contoured stringer component thereon;
installing a filler between the first contoured stringer component and the second contoured stringer component; and
placing a third stringer component on top of the first contoured stringer component and the second contoured stringer component.

11. The method of claim 10 further comprising:
vacuum bagging the first contoured stringer component, the second contoured stringer component, and third stringer component; and
curing the first contoured stringer component, the second contoured stringer component, and third stringer component.

12. The method of claim 10, wherein:
the first contoured stringer component and the second contoured stringer component consist of a left-side stringer component and a right-side stringer component.

13. The method of claim 1, wherein forming the first multi-ply composite charge over the length of the first forming mandrel and into a first contoured stringer component includes:
clamping a first section of the first multi-ply composite charge against a first portion of the first forming mandrel using a first forming member; and
forming a second section of the first multi-ply composite charge onto a second portion of the first forming mandrel using a second forming member.

14. The method of claim 1, wherein:
laying up the plurality of separate composite charges includes laying up the separate pluralities of composite plies on differing sections of the continuous flexible film; and
rolling the composite charge includes rolling each of the sections of the continuous flexible film onto the roll.

15. The method of claim 1, wherein:
forming the composite charges includes transferring the composite charges to a corresponding forming mandrel; and
sweeping the composite charge down onto the corresponding forming mandrel in order to form the composite charge to a desired cross-sectional shape and longitudinal contour.

16. The method of claim 1, wherein:
unrolling each of the separate multi-ply composite charges at the forming station includes simultaneously drawing spent film onto a take-up roll and unrolling a next-to-be-formed composite charge onto the forming station.

17. A method of fabricating contoured composite stiffeners, comprising:
laying up a plurality of separate composite charges in series onto a continuous flexible film at a layup station, wherein each of the separate composite charges corresponds to a portion of one or more contoured composite stiffeners, and wherein each of the separate composite charges has dimensions corresponding to a respective portion of the one or more contoured composite stiffeners;
rolling up the continuous flexible film along with each of the plurality of composite charges onto a roll;
transporting the roll having the plurality of composite charges thereon from the layup station to a forming station, including a forming mandrel;
adjustably configuring a shape of the forming mandrel to substantially match a lengthwise contour of a contoured composite stiffener;
unrolling a first composite charge of the plurality of composite charges at the forming station across a length of the forming mandrel;
aligning the first composite charge with the forming mandrel;
forming the first composite charge onto the forming mandrel over the length of the forming mandrel; and
transporting the forming mandrel having the first composite charge thereon from the forming station to an assembly station.

18. A method of fabricating contoured composite stiffeners, comprising:
laying up a plurality of separate multi-ply composite charges in series onto a continuous flexible film at a layup station, wherein each of the separate multi-ply composite charges corresponds to a portion of one or more contoured composite stiffeners, and wherein each of the separate multi-ply composite charges has dimensions corresponding to a respective portion of the one or more contoured composite stiffeners;

rolling up the continuous flexible film along with each of the plurality of composite charges onto a roll;

transporting the roll having the plurality of composite charges thereon from the layup station to a forming station, including a plurality of forming mandrels; and applying the plurality of separate multi-ply composite charges to a plurality of forming mandrels by repeatedly:

configuring a shape of a respective forming mandrel of the plurality of forming mandrels to substantially match a contour of a respective composite stiffener;

unrolling a respective multi-ply charge of the plurality of composite charges at the forming station across a length of the respective forming mandrel;

aligning the respective multi-ply charge with the respective forming mandrel;

forming the respective multi-ply charge over the length of the respective forming mandrel; and transporting the respective forming mandrel having the respective contoured stringer component thereon from the forming station to an assembly station.

* * * * *